(12) United States Patent
Ishimori et al.

(10) Patent No.: US 9,354,299 B2
(45) Date of Patent: May 31, 2016

(54) RADAR APPARATUS AND SIGNAL PROCESSING METHOD

(71) Applicant: FUJITSU TEN LIMITED, Kobe-shi, Hyogo (JP)

(72) Inventors: Hiroyuki Ishimori, Kobe (JP); Masayuki Kishida, Kobe (JP); Hisateru Asanuma, Kobe (JP); Masatoshi Aoki, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 275 days.

(21) Appl. No.: 14/071,808

(22) Filed: Nov. 5, 2013

(65) Prior Publication Data

US 2014/0159948 A1  Jun. 12, 2014

(30) Foreign Application Priority Data

Dec. 7, 2012  (JP) .................. 2012-268063

(51) Int. Cl.
| | |
|---|---|
| *G01S 7/41* | (2006.01) |
| *G01S 7/35* | (2006.01) |
| *G01S 13/34* | (2006.01) |
| *G01S 13/42* | (2006.01) |

(Continued)

(52) U.S. Cl.
CPC . *G01S 7/41* (2013.01); *G01S 7/354* (2013.01); *G01S 13/345* (2013.01); *G01S 13/42* (2013.01); *G01S 13/726* (2013.01); *G01S 13/931* (2013.01); *G01S 7/03* (2013.01)

(58) Field of Classification Search
CPC ....... G01S 7/41; G01S 13/931; G01S 13/726; G01S 7/354; G01S 13/345; G01S 13/42; G01S 7/03

USPC ............ 342/200, 196, 70–72, 128, 133, 139, 342/141, 146–147

See application file for complete search history.

(56) References Cited

U.S. PATENT DOCUMENTS

| | | | |
|---|---|---|---|
| 5,612,699 A | 3/1997 | Yamada | |
| 7,741,961 B1 * | 6/2010 | Rafii | ...................... B60Q 9/005 340/435 |

(Continued)

FOREIGN PATENT DOCUMENTS

| | | | |
|---|---|---|---|
| JP | 06109834 A | * | 4/1994 |
| JP | A-2012-013484 | | 1/2012 |

OTHER PUBLICATIONS

Mar. 31, 2015 European Search Report issued in European Patent Application No. 13191768.4.

(Continued)

*Primary Examiner* — John B Sotomayor
(74) *Attorney, Agent, or Firm* — Oliff PLC

(57) ABSTRACT

There is provided a radar apparatus. A derivation unit derives target information which is information relating to a target detected on the basis of a transmission signal of which a frequency changes with a predetermined cycle and a reception signal corresponding to a reflected wave coming from an object at which a transmission wave corresponding to the transmission signal is reflected. A determination unit determines reliability of the target information. A decision unit decides whether the detected target is true or false, based on the target information. The decision unit changes a method of deciding whether the target is true or false in accordance with a determination result of the reliability by the determination unit.

12 Claims, 35 Drawing Sheets

(51) Int. Cl.
  *G01S 13/72* (2006.01)
  *G01S 13/93* (2006.01)
  *G01S 7/03* (2006.01)

(56) References Cited

U.S. PATENT DOCUMENTS

2008/0079629 A1    4/2008  Oka et al.
2010/0271257 A1*  10/2010  Hirogari ............... G01S 13/726
                                                               342/107
2010/0271258 A1*  10/2010  Takabayashi ......... G01S 13/931
                                                               342/107
2011/0074622 A1    3/2011  Shibata et al.
2012/0112951 A1    5/2012  Nakanishi et al.

OTHER PUBLICATIONS

Sep. 6, 2015 Office Action issued in Chinese Patent Application No. 201310556844.X.

* cited by examiner

FIG. 18
FIRST TARGET
(DETECT NEW MOVING OBJECT PAIRED DATA)
CONTINUITY COUNTER = 0
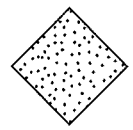
SECOND TARGET
CONTINUITY EXIST
DISCONTINUITY COUNTER = 1
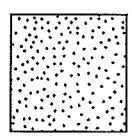
THIRD TARGET
CONTINUITY EXIST
CONTINUITY COUNTER = 2
STATIONARY OBJECT VICINITY FLAG (LINE) = OFF
CONTINUITY PAIR DECISION FLAG = ON
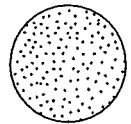

FIG. 20

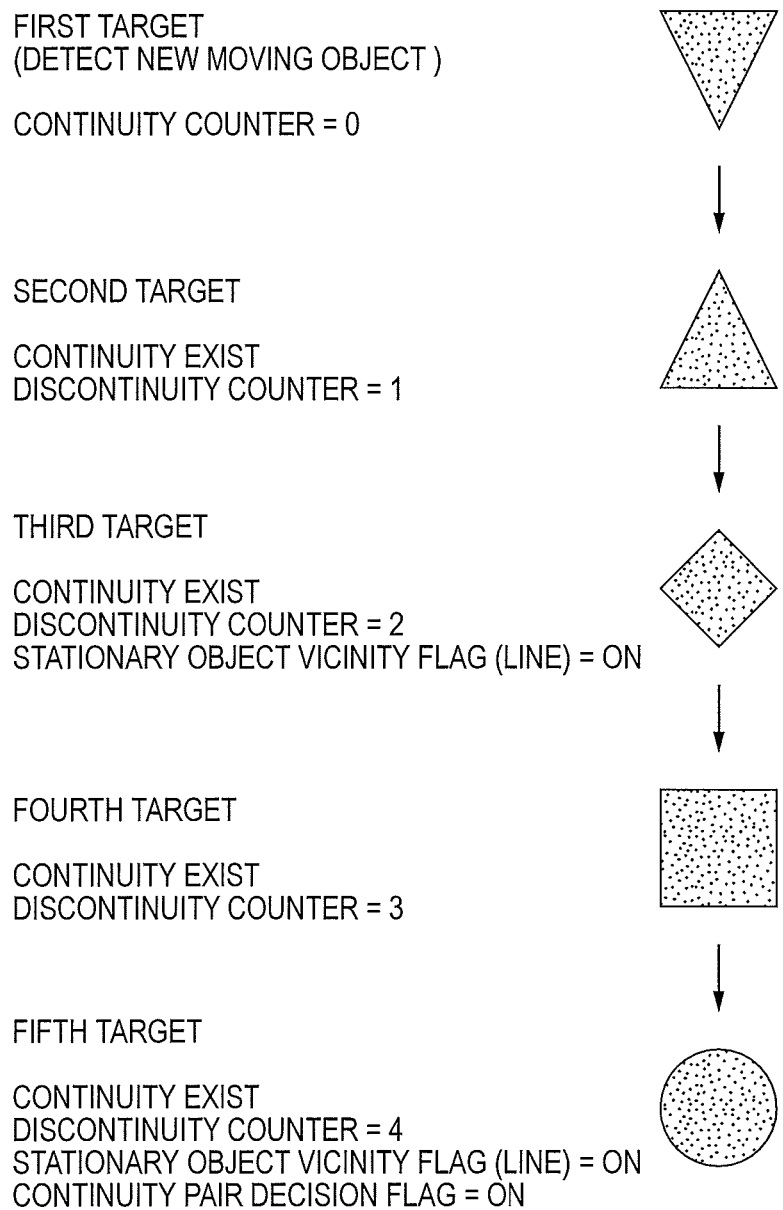

FIRST TARGET
(DETECT NEW MOVING OBJECT)

CONTINUITY COUNTER = 0

SECOND TARGET

CONTINUITY EXIST
DISCONTINUITY COUNTER = 1

THIRD TARGET

CONTINUITY EXIST
DISCONTINUITY COUNTER = 2
STATIONARY OBJECT VICINITY FLAG (LINE) = ON

FOURTH TARGET

CONTINUITY EXIST
DISCONTINUITY COUNTER = 3

FIFTH TARGET

CONTINUITY EXIST
DISCONTINUITY COUNTER = 4
STATIONARY OBJECT VICINITY FLAG (LINE) = ON
CONTINUITY PAIR DECISION FLAG = ON

FIG. 21

FIRST TARGET
(DETECT NEW MOVING OBJECT PAIRED DATA)

CONTINUITY COUNTER = 0

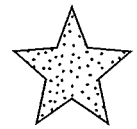

SECOND TARGET
(NON-DETECTION)

DISCONTINUITY COUNTER = 4

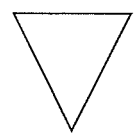

THIRD TARGET
(RE-DETECTION)

DISCONTINUITY COUNTER = 4

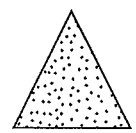

FOURTH TARGET

CONTINUITY EXIST
DISCONTINUITY COUNTER = 3

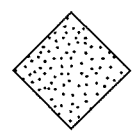

FIFTH TARGET

CONTINUITY EXIST
DISCONTINUITY COUNTER = 2

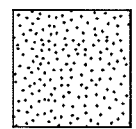

SIXTH TARGET

CONTINUITY EXIST
DISCONTINUITY COUNTER = 1
STATIONARY OBJECT VICINITY FLAG (LINE) = ON
CONTINUITY PAIR DECISION FLAG = ON

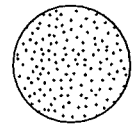

RADAR APPARATUS AND SIGNAL PROCESSING METHOD

CROSS-REFERENCE TO RELATED APPLICATIONS

This application is based on and claims priority from Japanese Patent Application No. 2012-268063 filed on Dec. 7, 2012.

TECHNICAL FIELD

The invention relates to signal processing for derivation of a target.

BACKGROUND

In the past, a radar apparatus mounted on a vehicle emits a transmission wave from a transmission antenna and receives a reflected wave from a target, which reflects the emitted transmission wave, at a reception antenna to thus derive a target position and the like with respect to the vehicle (radar vehicle). The detailed processing thereof is as follows. A signal processing unit of the radar apparatus generates a beat signal by mixing a transmission signal corresponding to the transmission wave of which a frequency is changed with a predetermined period and a reception signal corresponding to the reflected wave. That is, the signal processing unit generates the beat signal based on a difference frequency (beat frequency) between the transmission signal and the reception signal in each of an UP section in which the frequency ascends with a predetermined period and a DOWN section in which the frequency descends.

Then, the signal processing unit generates a signal (hereinafter, referred to as a 'converted signal') with respect to each frequency by performing FFT (Fast Fourier Transform) for the beat signal. From the converted signals, the signal processing unit extracts a signal exceeding a threshold value of a predetermined signal level as a peak signal. Then, the signal processing unit derives paired data by pairing the peak signal of the UP section and the peak signal of the DOWN section based on a predetermined condition.

Then, the signal processing unit derives a distance (hereinafter, referred to a longitudinal distance) from the vehicle to the target or a distance (hereinafter, referred to as a transverse distance) of the target with respect to the vehicle in a direction substantially orthogonal to a traveling direction of the vehicle. Also, the signal processing unit derives a relative speed of the target with respect to the vehicle. In this way, the signal processing unit derives the position information of the target including the longitudinal and transverse distances of the target and the relative speed thereof, based on the paired data.

Then, the signal processing unit performs determination (hereinafter, referred to as 'continuity determination') processing of determining whether there is a temporally continuous relation between paired data (hereinafter, referred to as 'this time paired data') by this time processing and paired data (hereinafter, referred to as 'previous time paired data') by previous time processing. A case where there is a temporally continuous relation between both the paired data includes a case where data (hereinafter, referred to as 'predicted paired data'), which is obtained by predicting this time paired data based on the previous time paired data, is generated and difference values of the longitudinal distances, transverse distances and relative speeds of this time paired data and the predicted paired data are within predetermined values.

When the paired data having the temporally continuous relation is derived consecutively a predetermined number of times, for example, three times of this time, previous time and the time before last, the paired data is decided as a target and target information including the position information and relative speed of the target is output to a vehicle control device that controls behaviors of the vehicle. As a result, the vehicle control device performs required vehicle control in accordance with the information of the decided target that is output from the radar apparatus. For example, Patent Document 1 discloses a technology relating to the continuity determination.

Patent Document 1: Japanese Patent Application Publication No. 2012-013484A

However, when a plurality of targets exists at the periphery of the vehicle and the reception antenna receives the reflected waves from the plurality of targets at the same time, a plurality of peak signals is extracted on a frequency axis in the UP and DOWN sections after the FFT processing. Also, not only the peak signals corresponding to the targets but signals due to noises individually appear in the vicinity of the frequencies of the peak signals. When the signals due to the noises exceed a threshold value, the signals are extracted as peak signals. In this way, when the peak signals exist on the frequency axis of the UP and DOWN sections, paired data (hereinafter, referred to as 'mis-paired data') paired in an incorrect combination other than a correct combination may satisfy a condition of paired data (hereinafter, referred to as 'normal-paired data') paired in a correct combination.

When the mis-paired data is derived, the false position information or relative speed different from the position information or relative speed of the target actually existing is output to the vehicle control device. In this case, since the vehicle control device controls the vehicle on the basis of the false position information or relative speed, the required vehicle control may not be performed or unnecessary vehicle control may be performed.

In particular, for example, when the vehicle is traveling in a tunnel or in the vicinity of a road side object such as a guard rail, a plurality of peak signals based on reflected waves from the road side object is detected, so that a possibility of the mis-pairing is increased. Like this, in the situation where the possibility of the mis-pairing is high, a possibility that the mis-paired data having a temporally continuous relation will be derived consecutively three times is also increased. When the mis-paired data is derived consecutively three times, a target that does not originally exist is decided as a moving object (i.e., a ghost is detected). Thereby, the vehicle control is performed while erroneously considering that a preceding vehicle exists.

SUMMARY

It is therefore an object of the invention to provide a technology for avoiding ghost detection even when a vehicle is traveling in a situation where a ghost is easily detected (a situation where a possibility of mis-pairing is high).

(1) According to an aspect of the embodiments of the present invention, there is provided a radar apparatus comprising: a derivation unit configured to derive target information which is information relating to a target detected on the basis of a transmission signal of which a frequency changes with a predetermined cycle and a reception signal corresponding to a reflected wave coming from an object at which a transmission wave corresponding to the transmission signal is reflected; a determination unit configured to determine reliability of the target information; and a decision unit configured to decide whether the detected target is true or false, based on the target information, wherein the decision unit changes a method of deciding whether the target is true or false in accordance with a determination result of the reliability by the determination unit.

(2) The radar apparatus according to (1), wherein the decision unit determines whether each target corresponding to the target information which is temporally consecutively derived is the same target, wherein when it is determined consecutively predetermined number of times that each target is the same target, the decision unit decides the target as a true target, and wherein the decision unit changes the predetermined number of times in accordance with the determination result of the reliability.

(3) The radar apparatus according to (2), wherein the decision unit increases the predetermined number of times when the reliability is low.

(4) The radar apparatus according to any one of (1) to (3), further comprising: an extraction unit configured to extract peak signals which are obtained from a difference frequency between the transmission signal and the reception signal, in a first period in which the frequency of the transmission signal ascends and a second period in which the frequency descends; and a pairing unit configured to pair the peaks signal of the first period and the peak signal of the second period based on a predetermined condition, wherein the determination unit determines the reliability on the basis of a true-false possibility of the pairing.

(5) The radar apparatus according to (4), wherein the determination unit determines that the reliability is low when there is a possibility that the pairing is falsely made.

(6) The radar apparatus according to (4) or (5), wherein the determination unit determines that the reliability is low when the detected target is a moving target and a position of the moving target is included within a predetermined range from a position of the other stationary target.

(7) The radar apparatus according to (6), wherein the target information includes an own traffic lane probability indicating a probability that a target exists on a traffic lane in which a vehicle mounted with the radar apparatus is traveling, and wherein the other stationary object is extracted from a stationary target existing at a position that is more distant from the vehicle than a reference position determined based on the own traffic lane probability.

(8) The radar apparatus according to (7), wherein the reference position is a position corresponding to a distance in a direction substantially orthogonal to a central axis of the radar apparatus and is changeable depending on the own traffic lane probability.

(9) The radar apparatus according to (4) or (5), wherein the determination unit determines that the reliability is low when a difference of respective reception levels of the target information which is temporally consecutively derived is a predetermined value or larger.

(10) The radar apparatus according to (4) or (5), wherein the determination unit determines that the reliability is low when a sum of respective Mahalanobis distances included in the target information which is temporally consecutively derived is a predetermined value or larger.

(11) The radar apparatus according to (4) or (5), wherein the determination unit determines that the reliability is low when a number of stationary targets present on a traffic lane in which a vehicle mounted with the radar apparatus is traveling is a predetermined value or larger.

(12) According to another aspect of the embodiments of the present invention, there is provided a signal processing method comprising: (a) deriving target information which is information relating to a target detected on the basis of a transmission signal of which a frequency changes with a predetermined cycle and a reception signal corresponding to a reflected wave coming from an object at which a transmission wave corresponding to the transmission signal is reflected; (b) determining reliability of the target information; and (c) deciding whether the detected target is true or false, based on the target information, wherein in the step (c), a method of deciding whether the target is true or false is changed in accordance with a determination result of the reliability.

According to the aspects defined in (1) to (12), the method of deciding whether the target is true or false is changed depending on the reliability of the target information of the detected target. Therefore, when the reliability of the target information is low, it is possible to prevent a false target from being decided.

Also, particularly, according to the aspects defined in (2) and (3), the number of times of deciding that the target is true is changed. In particular, the number of times is increased when the reliability is low. Thereby, it is possible to retard the decision of the target, so that it is possible to prevent a false target from being decided.

Also, particularly, according to the aspects defined in (4) and (5), the reliability is determined based on a possibility that the pairing is true or false. In particular, when there is a possibility that the pairing is falsely made, it is determined that the reliability is low. Therefore, it is possible to prevent a false target from being decided.

Also, particularly, according to the aspects defined in (6) and (9) to (11), it is possible to extract a moving target having a high possibility that the pairing is falsely made.

Also, particularly, according to the aspect defined in (7) and (8), the target, which is detected at a position at which there is a high possibility that a plurality of stationary targets such as a road side object exists, is used. Therefore, it is possible to effectively extract a target having a high possibility that the pairing is falsely made. Also, it is possible to prevent a target, which is detected on the traffic lane in which the vehicle is traveling, from being falsely used as a determination target of the reliability.

BRIEF DESCRIPTION OF THE DRAWINGS

In the accompanying drawings:

FIG. 18 is a flow chart showing the continuity determining (target deciding) processing;

FIG. 20 is a flow chart showing the continuity determining (target deciding) processing;

FIG. 21 is a flow chart showing the continuity determining (target deciding) processing;

DETAILED DESCRIPTION OF THE EMBODIMENTS

Hereinafter, illustrative embodiments of the invention will be described with reference to the drawings.

1. First Illustrative Embodiment

1-1. Configuration

Figure 1:
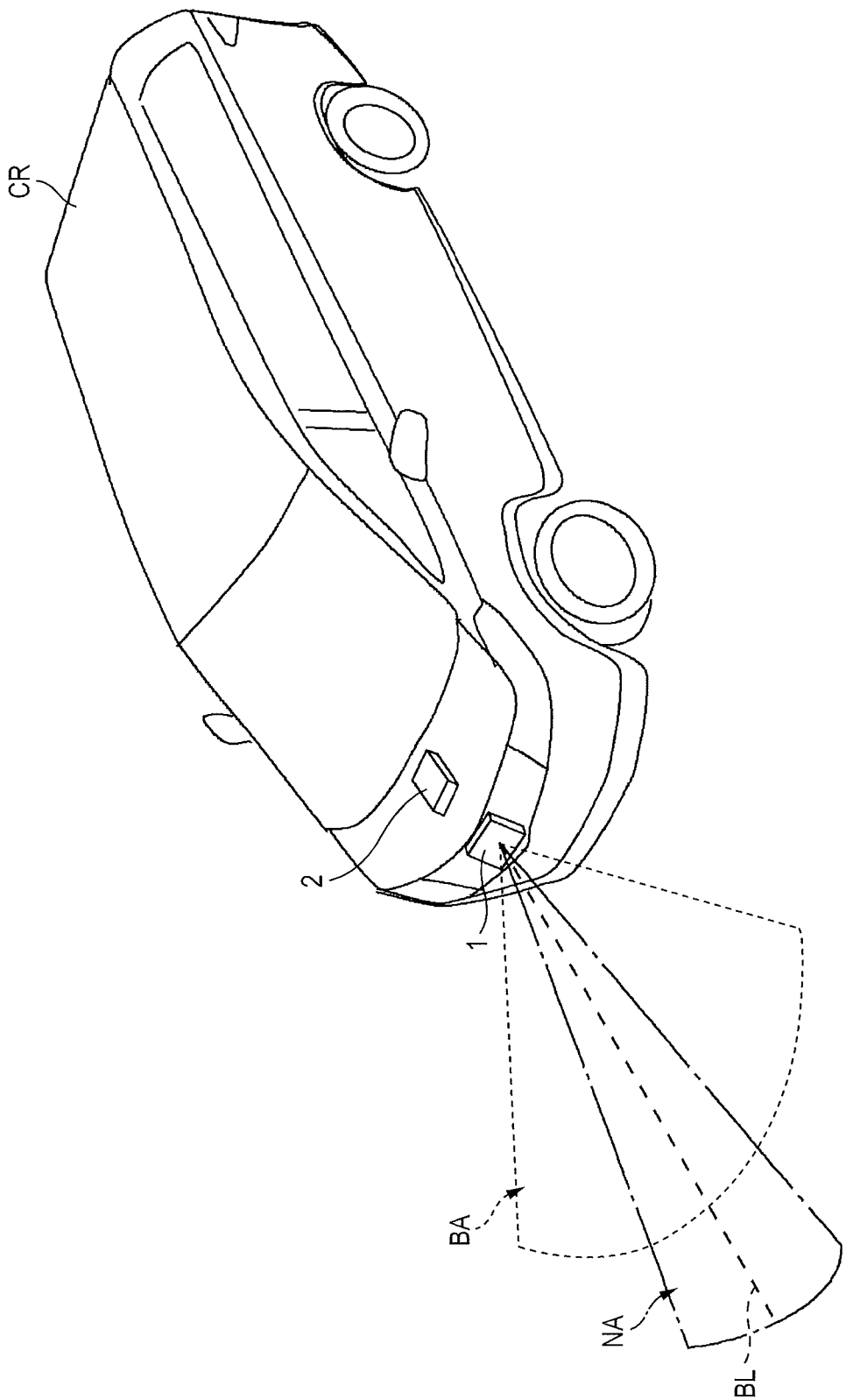
FIG. 1 is an overall view of a vehicle.

FIG. 1 is an overall view of a vehicle CR. The vehicle CR mainly has a radar apparatus 1 and a vehicle control device 2, which are included in a vehicle control system 10 of this illustrative embodiment. The vehicle CR has the radar apparatus 1 in the vicinity of a front bumper of the vehicle. The radar apparatus 1 scans a predetermined scanning scope by one scanning to thus derive a distance between the vehicle CR and a target in a vehicle traveling direction, i.e., a distance (hereinafter, referred to as a 'longitudinal distance') until a reflected wave from the target arrives at a reception antenna of the radar apparatus 1. Also, the radar apparatus 1 derives a distance between the vehicle CR and the target in a vehicle transverse direction (a vehicle width direction), i.e., a distance (hereinafter, referred to as a 'transverse distance') of the target with respect to the vehicle CR in a direction substantially orthogonal to a reference axis BL virtually extending in the traveling direction of the vehicle CR. In the meantime, the transverse distance is derived by performing a trigonometric function calculation for information on an angle of the target with respect to the vehicle CR. In this way, the radar apparatus 1 derives the position information of the target with respect to the vehicle CR. Also, the radar apparatus 1 derives a relative speed that is a speed of the target relative to a speed of the vehicle CR.

In the meantime, FIG. 1 shows beam patterns of transmission waves that are transmitted from two transmission antennas (a transmission antenna 13a and a transmission antenna 13b shown in FIG. 2) of the radar apparatus 1, which will be described later. When the reference axis BL is ±0°, a beam pattern NA of the transmission wave that is output from the transmission antenna 13a has a narrower angle range (for example, ±6°) than a beam pattern BA of the transmission wave, which is output from the transmission antenna 13b, and is output in the shape of a sharp beam pattern having a long longitudinal distance. The reason why the longitudinal distance is long is that an output level of outputting the transmission wave is relatively high.

In contrast, the beam pattern BA of the transmission wave that is output from the transmission antenna 13b has a wider angle range (for example, ±10°) than the beam pattern NA of the transmission wave that is output from the transmission antenna 13a, and is output in the shape of a broad beam pattern having a short longitudinal distance. The reason why the longitudinal distance is short is that an output level of outputting the transmission wave is relatively low. In each of a transmission period in which the transmission wave is output from the transmission antenna 13a and a transmission period in which the transmission wave is output from the transmission antenna 13b, the transmission waves of different beam patterns are output, so that it is possible to prevent an error of an angle derivation, which is caused due to a phase fold-back of the target. Processing of deriving a target angle will be described later.

Also, the radar apparatus 1 of FIG. 1 is mounted in the vicinity of the front bumper of the vehicle. However, the radar apparatus may be mounted to another part, for example in the vicinity of a rear bumper of the vehicle CR and in the vicinity of a side mirror of the vehicle CR without being limited to the vicinity of the front bumper, inasmuch as it is possible to derive a target in accordance with a control object of the vehicle CR of the vehicle control device 2 at the corresponding mount position.

Also, the vehicle CR has the vehicle control device 2 in the vehicle CR. The vehicle control device 2 is an ECU (Electronic Control Unit) that controls respective devices of the vehicle CR.

Figure 2:
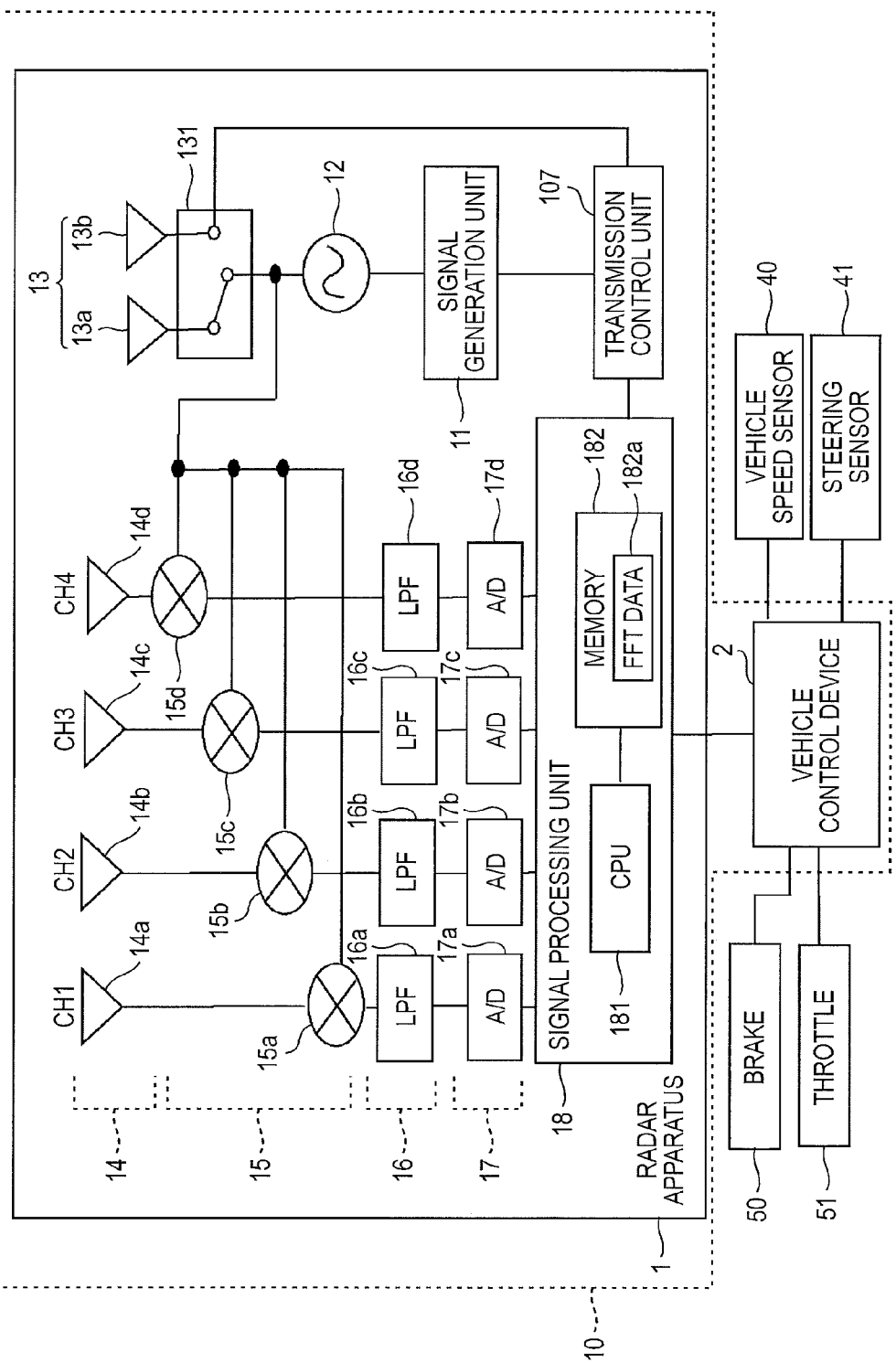
FIG. 2 is a block diagram of a vehicle control system.

FIG. 2 is a block diagram of the vehicle control system 10. The vehicle control system 10 is configured so that the radar apparatus 1 and the vehicle control device 2 are electrically connected and the target information on the position and the relative speed, which are usually derived from the radar apparatus 1, is output to the vehicle control device 2. That is, the radar apparatus 1 outputs the target information, which is the information on the longitudinal distance, transverse distance and relative speed of the target with respect to the vehicle CR, to the vehicle control device 2. Then, the vehicle control device 2 controls operations of the various devices of the vehicle CR, based on the target information. Also, the vehicle control device 2 is electrically connected to a variety of sensors provided to the vehicle CR, such as a vehicle speed sensor 40 and a steering sensor 41. Also, the vehicle control device 2 is electrically connected to a variety of devices provided to the vehicle CR, such as a brake 50 and a throttle 51.

The radar apparatus 1 mainly has a signal generation unit 11, an oscillator 12, a transmission antenna 13, a reception antenna 14, a mixer 15, an LPF (Low Pass Filter) 16, an AD (Analog to Digital) converter 17 and a signal processing unit 18.

The signal generation unit 11 generates a modulation signal of which a voltage changes in a triangular wave shape, for example, based on a control signal of a transmission control unit 107 that will be described later.

The oscillator 12 is a voltage control oscillator that controls an oscillation frequency with a voltage, frequency-modulates a predetermined frequency signal (for example, 76.5 GHz), based on the modulation signal generated from the signal generation unit 11, and outputs the same to the transmission antenna 13, as a transmission signal of a frequency band of which a central frequency is 76.5 GHz.

The transmission antenna 13 outputs a transmission wave relating to the transmission signal to the outside of the vehicle. In this illustrative embodiment, the radar apparatus 1 has two transmission antennas of the transmission antenna 13a and the transmission antenna 13b. The transmission antennas 13a, 13b are switched with a predetermined cycle by a switching operation of a switching unit 131, and the transmission wave is consecutively output to the outside of the vehicle from the transmission antenna 13 connected to the oscillator 12. The transmission antenna 13a and the transmission antenna 13b have different arrangements (antenna patterns) of antenna devices. Thereby, as shown in FIG. 1, the beam patterns of the transmission waves that are transmitted from the transmission antennas 13a, 13b are different.

The switching unit 131 is a switch for switching the transmission antenna 13 that is connected to the oscillator 12 and connects any one of the transmission antenna 13a and the transmission antenna 13b and the oscillator 12 each other in response to a signal of the transmission control unit 107.

The reception antenna 14 is a plurality of array antennas that receives the reflected waves coming from an object at which the transmission waves consecutively transmitted from the transmission antenna 13 are reflected. In this illustrative embodiment, the four reception antennas 14a (ch1), 14b (ch2), 14c (ch3) and 14d (ch4) are provided. In the meantime, each of the reception antennas 14a to 14d is arranged at an equal interval.

The mixer 15 is provided for each reception antenna. The mixer 15 mixes a reception signal and a transmission signal. The reception signal and the transmission signal are mixed, so that a beat signal, which is a difference signal between the reception signal and the transmission signal, is generated and is then output to the LPF 16.

Here, the reception signal and the transmission signal generating the beat signal are described with reference to an FW-CW (Frequency Modulated Continuous Wave) signal processing method shown in FIG. 3. Meanwhile, in this illustrative embodiment, the FW-CW method is described below. However, the invention is not limited to the FW-CW method and any method can be adopted inasmuch as the method derives a target by combining a plurality of sections including an UP section in which the frequency of the transmission signal ascends and a DOWN section in which the frequency of the transmission signal descends.

Also, symbols that are shown in equations and FIG. 3 for signals and beat frequencies of the FW-CW are as follows: fr: distance frequency, fd: speed frequency, fo: central frequency of transmission wave, $\Delta F$: frequency shift width, fm: repetition frequency of modulation wave, c: light speed (speed of electric wave), T: round-trip time of electric wave between vehicle CR and target, fs: transmission/reception frequency, R: longitudinal distance, V: relative speed, $\theta m$: angle of target, $\theta up$: angle corresponding to a peak signal in an UP section, $\theta dn$: angle corresponding to a peak signal in a DOWN section.

Figure 3:
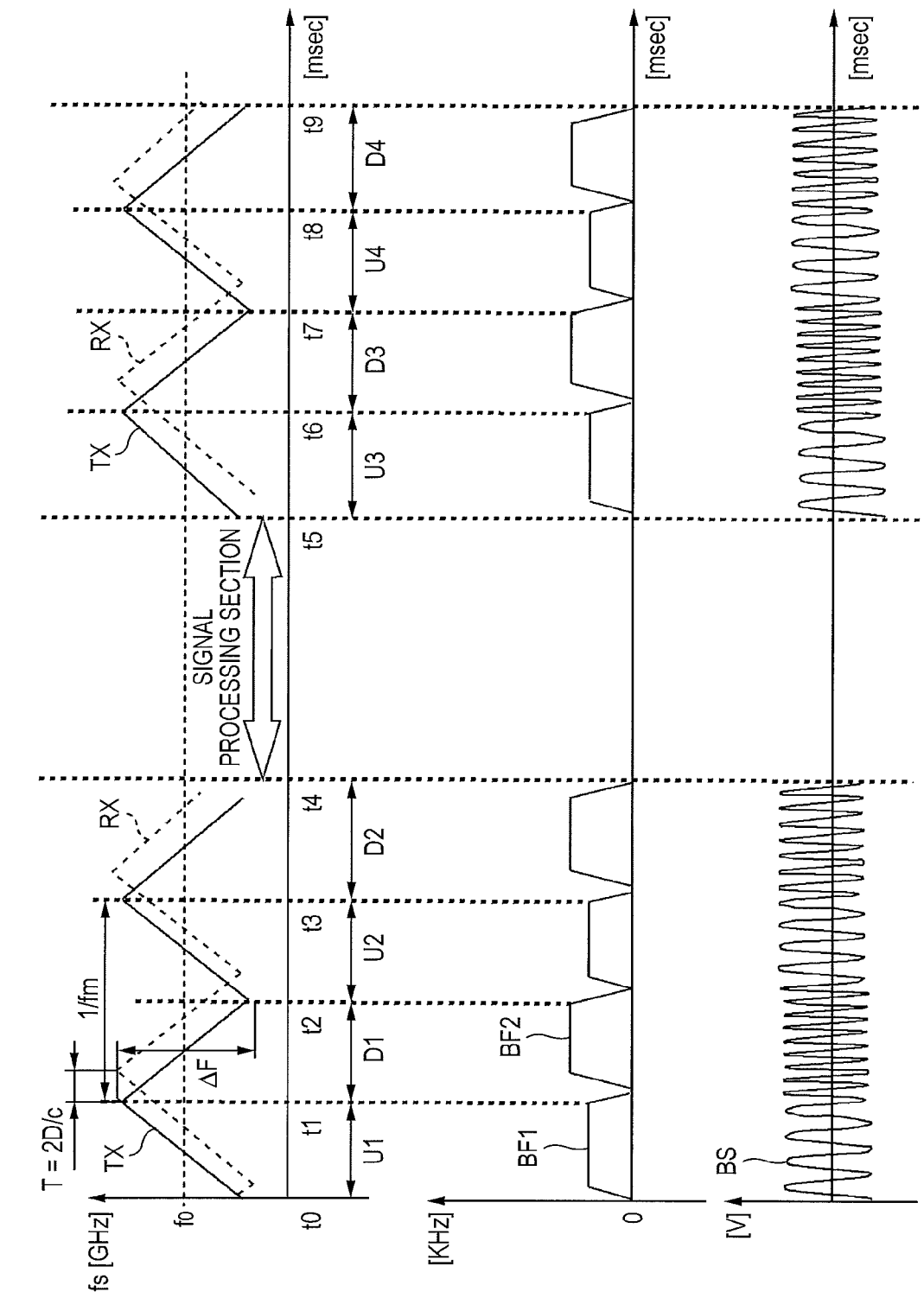
FIG. 3 is a view showing a signal of an FW-CW method.

FIG. 3 is a view showing a signal of the FW-CW method. At the upper of FIG. 3, signal waveforms of a transmission signal TX and a reception signal RX of the FW-CW method are shown, and a vertical axis indicates a frequency [GHz] and a horizontal axis indicates a time [msec]. The transmission signal TX has a central frequency fo (for example, 76.5 GHz) and repeats a constant change between 200 MHz so that it ascends up to a predetermined frequency (for example, 76.6 GHz) and then descends to a predetermined frequency (for example, 76.4 GHz). Like this, the transmission signal has a section (hereinafter, also referred to as 'UP section', for example, sections U1, U2, U3, U4 shown in FIG. 3 are UP sections) in which the frequency ascends to a predetermined frequency and a section (hereinafter, also referred to as 'DOWN section', for example, sections D1, D2, D3, D4 are DOWN sections) in which the frequency descends to a predetermined frequency after it has ascended to the predetermined frequency. Also, when the transmission wave transmitted from the transmission antenna 13 collides with an object and is then received at the reception antenna 14 as a reflected wave, the reception signal RX is input into the mixer 15 through the reception antenna 14. Like the transmission signal TX, the reception signal RX also has a section in which the frequency ascends to a predetermined frequency and a section in which the frequency descends to a predetermined frequency.

In the meantime, the radar apparatus 1 of this illustrative embodiment transmits a transmission wave, which corresponds to two cycles of the transmission signal TX in which one cycle of the transmission signal TX is a combination of one UP section and one DOWN section, to the outside of the vehicle. For example, in a first cycle (an UP section U1 of transmission time t0 to t1 and a DOWN section D1 of transmission time t1 to t2), a transmission wave having the beam pattern NA is output from the transmission antenna 13a. In a second cycle (an UP section U2 of transmission time t2 to t3 and a DOWN section D2 of transmission time t3 to t4) that is a next cycle, a transmission wave having the beam pattern BA is output from the transmission antenna 13b. Then, the signal processing unit 18 performs signal processing for deriving target information by the transmission signal TX and the reception signal RX (a signal processing section of time t4 to t5). After that, in a third cycle (an UP section U3 of transmission time t5 to t6 and a DOWN section D3 of transmission time t6 to t7), a transmission wave having the beam pattern NA is output from the transmission antenna 13a, in a fourth cycle (an UP section U4 of transmission time t7 to t8 and a DOWN section D4 of transmission time t8 to t9), a transmission wave having the beam pattern BA is output from the transmission antenna 13b and then the signal processing unit 18 performs the signal processing for deriving target information. Thereafter, the same processing is repeated.

In the meantime, the reception signal RX has a temporal delay (time T), compared to the transmission signal TX, depending on the distance between the target and the vehicle CR. Also, when there is a speed difference between a speed of the vehicle CR and a speed of the target, a difference corresponding to a Doppler shift is caused in the reception signal RX relative to the transmission signal TX.

At the middle of FIG. 3, a beat frequency resulting from a difference between the transmission signal TX and the reception signal RX is shown, and a vertical axis indicates a frequency [kHz] and a horizontal axis indicates time [msec]. For example, in the section U1, a beat frequency BF1 is derived, and in the section D1, a beat frequency BF2 is derived. In this way, the beat frequency is derived in each section.

At the lower of FIG. 3, a beat signal corresponding to the beat frequency is shown, a vertical axis indicates an amplitude [V] and a horizontal axis indicates time [msec]. In FIG. 3, an analog beat signal BS corresponding to the beat frequency is shown. The beat signal BS is filtered in the LPF 16 that will be described later and is then converted into digital data by the AD converter 17. Meanwhile, FIG. 3 shows the beat signal BS corresponding to the reception signal RX that is received from one reflection point. However, when the transmission wave corresponding to the transmission signal TX is reflected at a plurality of reflection points and is received at the reception antenna 14 as a plurality of reflected waves, signals corresponding to the reflected waves are generated as the reception signal RX. In this case, the beat signal BS indicating a difference between the transmission signal TX and the reception signal RX is a signal that is obtained by combining respective differences between the plurality of reception signals RX and the transmission signal TX.

After the beat signal BS is converted into the digital data by the AD converter 17, the digital data is FFT-processed for each of the UP and DOWN sections by the signal processing unit 18, so that FFT data having a signal level value and phase information is acquired for each frequency of the beat signal BS. Also, the FFT data is acquired for each of the reception antennas 14a to 14d.

The longitudinal distance, relative speed and transverse distance of the target with respect to the vehicle CR are derived using the plurality of FFT data derived as described above. Particularly, regarding the derivation of the angle, when a calculation method such as a spatial average is performed, the plurality of FFT data is used for the calculation, so that it is possible to derive the correct angle information.

The longitudinal distance of the target with respect to the vehicle CR is derived by an equation (1) and the relative speed of the target relative to the vehicle CR is derived by an equation (2). Also, the angle of the target with respect to the vehicle CR is derived by an equation (3). From the angle derived by the equation (3) and the longitudinal distance information of the target, the transverse distance of the target with respect to the vehicle CR is derived by a calculation using a trigonometric function.

[Equation 1]
$$R = \frac{(f_{up} + f_{dn}) \cdot c}{2 \times (4 \times \Delta F \times f_m)} \quad (1)$$

[Equation 2]
$$V = \frac{(f_{up} - f_{dn}) \cdot c}{2 \times (4 \times \Delta F \times f_m)} \quad (2)$$

[Equation 3]
$$\theta_m = \frac{\theta_{up} + \theta_{dn}}{2} \quad (3)$$

Returning back to FIG. 2, the LPF (Low Pass Filter) 16 is a filter that reduces a frequency component higher than a predetermined frequency without reducing a frequency component lower than the predetermined frequency. In the meantime, like the mixer 15, the LPF 16 is provided for each reception antenna.

The AD converter 17 samples the beat signal, which is an analog signal, with a predetermined cycle, thereby deriving a plurality of sampling data. Then, the AD converter quantizes the sampled data to thus convert the beat signal of the analog data into digital data, thereby outputting the digital data to the signal processing unit 18. In the meantime, the AD converter 17 is also provided for each reception antenna, like the mixer 15.

The signal processing unit 18 is a computer having a CPU 181 and a memory 182, performs the FFT processing for the beat signal of the digital data output from the AD converter 17 to thus acquire the FFT data and extracts a signal having a signal level value exceeding a predetermined threshold from the beat signal of the FFT data, as a peak signal. The signal processing unit 18 derives the target information of the target by pairing the peak signal of the UP section and the peak signal of the DOWN section. Also, the signal processing unit 18 performs processing of determining whether the extracted peak signal is a ghost peak corresponding to a target that does not actually exist and excluding target information corresponding to a peak signal of a ghost from an output object of the radar apparatus.

The memory 182 stores therein execution programs for a variety of calculation processing and the like that are executed by the CPU 181. Also, the memory 182 stores therein the plurality of target information derived by the signal processing unit 18. For example, the memory stores therein the target information (the longitudinal distance, transverse distance and relative speed of the target) derived in past processing and in this time processing. Also, the memory 182 stores therein FFT data 182a that is acquired by the FFT processing. In the FFT data 182a, the FFT data of the past target deriving processing is stored including the FFT data of this time target deriving processing.

The transmission control unit 107 is connected to the signal processing unit 18 and outputs a control signal to the signal generation unit 11 generating a modulation signal, based on a signal from the signal processing unit 18. Also, the transmission control unit 107 outputs a control signal to the switching unit 131, to which any one of the transmission antenna 13a and the transmission antenna 13b and the oscillator 12 are connected, based on a signal from the signal processing unit 18.

The vehicle control device 2 controls operations of various devices of the vehicle CR. That is, the vehicle control device 2 acquires information from the various sensors such as the vehicle speed sensor 40 and the steering sensor 41. The vehicle control device 2 operates a variety of devices such as the brake 50 and the throttle 51 to thus control behaviors of the vehicle CR, based on the information acquired from the various sensors and the target information acquired from the signal processing unit 18 of the radar apparatus 1.

An example of the vehicle control that is performed by the vehicle control device 2 is as follows. The vehicle control device 2 performs control of enabling the vehicle CR to follow up a preceding vehicle that is traveling at the front of the vehicle CR in an own traffic lane in which the vehicle CR is traveling. Specifically, as the vehicle CR travels, the vehicle control device 2 performs ACC (Adaptive Cruise Control) control of controlling at least one of the brake 50 and the throttle 51 and thus enabling the vehicle CR to follow up the preceding vehicle at a state where a predetermined inter-vehicular distance is secured between the vehicle CR and the preceding vehicle.

Also, an example of the vehicle control that is performed by the vehicle control device 2 includes performing control of protecting a passenger in the vehicle CR, in preparation for collision of the vehicle CR with an obstacle. Specifically, when there is a danger that the vehicle CR will collide with an obstacle, the vehicle control device performs the PCS (Pre-Crash Safety System) control of displaying a warning by using a warning device (not shown) to a user of the vehicle CR or controlling the brake 50 to thus lower the speed of the vehicle CR. Also, the vehicle control device 2 performs the PCS control of fastening a passenger to a seat by a seat belt in the vehicle or fixing a headrest to thus reduce damage to a user of the vehicle CR, which is caused due to shock upon the collision.

The vehicle speed sensor 40 outputs a signal corresponding to the speed of the vehicle CR, based on the number of revolutions of an axle of the vehicle CR. The vehicle control device 2 acquires a current vehicle speed, based on the signal from the vehicle speed sensor 40.

The steering sensor 41 detects a rotating angle of a steering wheel resulting from an operation of a driver of the vehicle CR and transmits the angle information of the vehicle body of the vehicle CR to the vehicle control device 2.

The brake 50 decelerates the speed of the vehicle CR in response to an operation of the driver of the vehicle CR. Also, the brake 50 decelerates the speed of the vehicle CR under control of the vehicle control device 2. For example, the brake decelerates the speed of the vehicle CR so that the distance between the vehicle CR and the preceding vehicle is kept constant.

The throttle 51 accelerates the speed of the vehicle CR in response to an operation of the driver of the vehicle CR. Also, the throttle 51 accelerates the speed of the vehicle CR under control of the vehicle control device 2. For example, the throttle 51 accelerates the speed of the vehicle CR so that the distance between the vehicle CR and the preceding vehicle is kept constant.

1-2. Overall Processing

Figure 4:
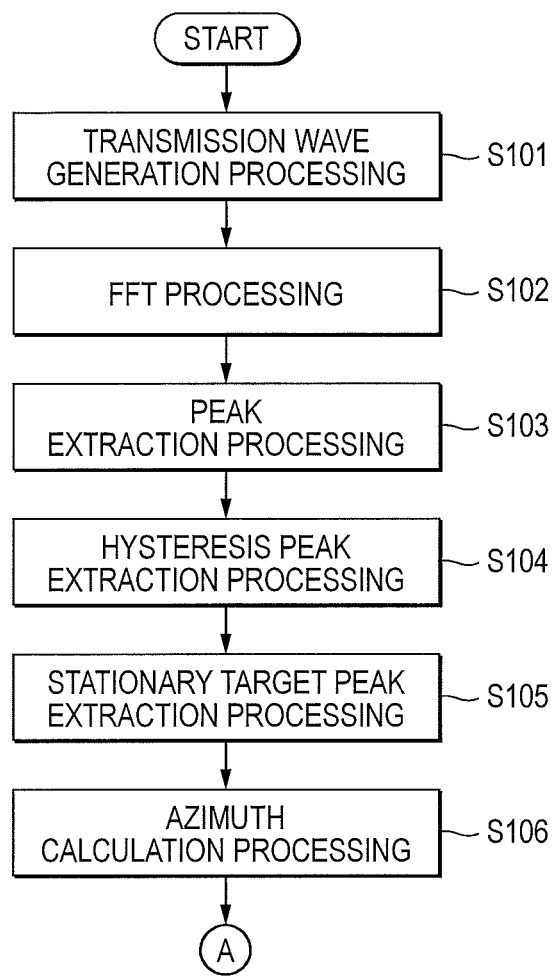
FIG. 4 is a flow chart showing target information deriving processing.
Figure 5:
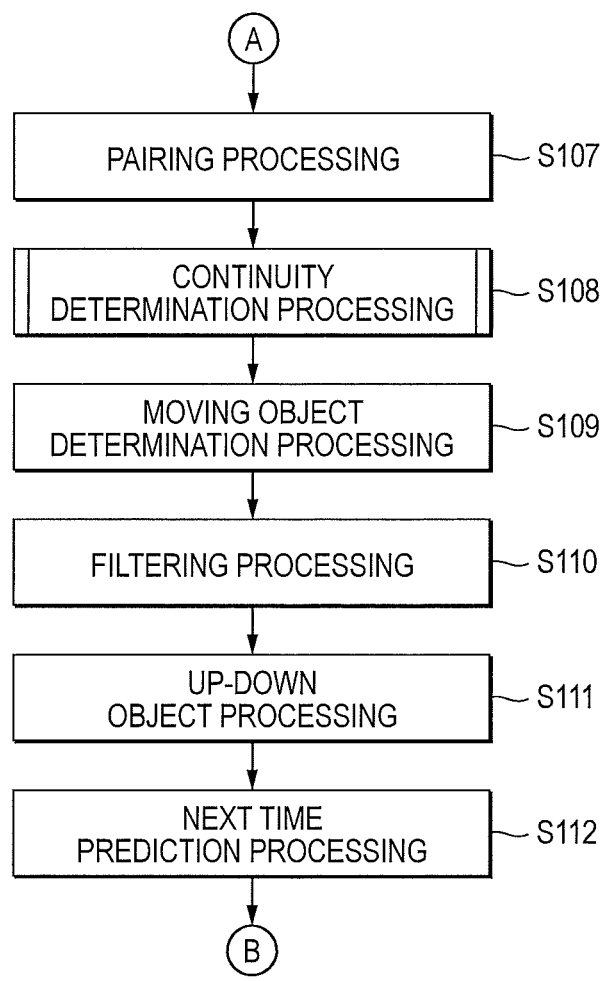
FIG. 5 is a flow chart showing the target information deriving processing.
Figure 6:
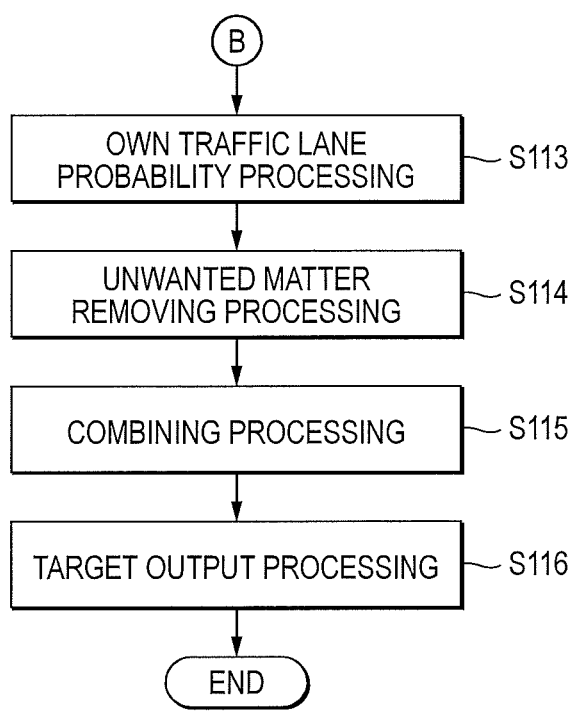
FIG. 6 is a flow chart showing the target information deriving processing.

FIGS. 4 to 6 are flow charts of target information deriving processing that is executed by the signal processing unit 18. First, the signal processing unit 18 outputs an instruction signal for generating a transmission wave to the transmission control unit 107 (step S101). Then, the signal generation unit 11 is controlled by the transmission control unit 107 to which the instruction signal is input from the signal processing unit 18, and a transmission wave corresponding to the transmission signal TX is generated. The generated transmission wave is output to the outside of the vehicle.

Then, the reception antenna 14 receives a reflected wave coming from a target at which the transmission wave is reflected, and the reception signal RX corresponding to the reflected wave and the transmission signal TX are mixed by the mixer 15, so that a beat signal, which is a difference signal between the transmission signal and the reception signal, is generated. Then, the beat signal BS that is an analog signal is filtered by the LPF 16, is converted into digital data by the AD converter 17 and is then input to the signal processing unit 18.

The signal processing unit 18 performs the FFT processing for the beat signal of the digital data (step S102) and acquires the FFT data having signal level values of the beat signals with respect to each frequency.

Then, the signal processing unit 18 extracts, as a peak signal, a beat signal having a signal level value exceeding a predetermined threshold from the beat signals of the FFT data (step S103). Meanwhile, in this processing, the peak signals of all sections of the UP sections and the DOWN sections corresponding to the two cycles of the transmission period are extracted and the number of peak signals is decided.

Then, the signal processing unit 18 performs hysteresis peak extraction processing of extracting a peak signal having temporal continuity with a target derived in the past target deriving processing from the peak signals extracted in the peak extraction processing (step S104).

Then, from the speed information of the vehicle CR output from the vehicle speed sensor 40, the signal processing unit 18 performs processing of extracting a peak signal of each section, in which a frequency difference between the peak signal of the UP section and the peak signal of the DOWN section corresponds to the speed, as a peak signal corresponding to a stationary object (step S105). Here, the stationary object means a target having the substantially same relative speed as the speed of the vehicle CR. Also, a target that moves at a specific speed and has a different relative speed from the speed of the vehicle CR is hereinafter referred to as a moving object.

In the meantime, the reason to perform the hysteresis peak extraction (step S104) and the stationary object peak extraction (step S105) is that the signal processing unit 18 is to select a peak signal corresponding to a target that should be preferentially output to the vehicle control device 2. For example, the peak signal of the target of this time processing having temporal continuity with the target derived in the previous time processing may have a high priority because there is a high probability that a target actually exists, compared to a newly derived target that has not been derived in the previous time processing, and also may have a high priority because a peak signal corresponding to a moving object has a high possibility that the moving object will collide with the vehicle CR, compared to a peak signal corresponding to a stationary object.

In each of the UP and DOWN sections, the signal processing unit 18 performs an azimuth calculation, based on the peak signals (step S106). Specifically, the signal processing unit 18 derives an azimuth (angle) of the target by a predetermined azimuth calculation algorithm. For example, the azimuth calculation algorithm is an ESPRIT (Estimation of Signal Parameters via Rotation Invariance Techniques), calculates an eigenvalue of a correlation matrix, an eigenvector and the like from the phase information of the reception signals received at the respective reception antennas 14a to 14d and derives an angle θup corresponding to a peak signal of the UP section and an angle θdn corresponding to a peak signal of the DOWN section. When the respective peak signals of the UP and DOWN sections are paired, an angle of the target is derived by the equation (3). Also, the frequency information of one peak signal corresponds to the information on the distance and relative speed of the target. However, the frequency of one peak signal may include a plurality of target information. For example, regarding the position information of the target with respect to the vehicle CR, a plurality of target information of which the distances are the same and the angles are different may be included in the peak signal of the same frequency. In this case, the phase information of a plurality of reflected waves coming at different angles becomes different phase information, respectively. Therefore, the signal processing unit 18 derives a plurality of target information existing at different angles for one peak signal, based on the phase information of the respective reflected waves.

Here, when performing the azimuth calculation, a phase may be 360°-rotated depending on the angle of the target, so that information of an angle different from an original angle at which the target exists may be derived. Specifically, for example, when the phase information of the reflected wave from a target, which is received at the reception antenna, is 420°, even though an actual target exists in the area of the beam pattern BA, other than the beam pattern NA shown in FIG. 1, the actual target may be determined that the phase information is 60°) (420°-360° due to the phase fold-back, and false angle information that the target exists in the area of the beam pattern NA not included in the beam pattern BA may be derived. Therefore, the transmission waves of the two beam patterns are output from the transmission antennas 13a, 13b, so that a correct angle of the target is derived.

Specifically, an angle is derived as follows, based on the reflected waves with respect to the transmission waves of the respective beam patterns. When the phase information of the reflected wave is 60°, the signal level values of angle spectra corresponding to the reflected wave of the transmission wave output from the transmission antenna 13a and the reflected wave of the transmission wave output from the transmission antenna 13b are compared. When the signal level value of the angle spectrum corresponding to the reflected wave of the transmission wave output from the transmission antenna 13a is larger, an angle corresponding to the phase information of 60° in the area of the beam pattern NA except for the area of the beam pattern BA is derived as a target angle. Also, when the signal level value of the angle spectrum corresponding to the reflected wave of the transmission wave output from the transmission antenna 13b is larger, an angle corresponding to the phase information of 420° in the area of the beam pattern BA except for the area of the beam pattern NA is derived as a target angle. In this way, by the transmission waves of two cycles of the transmission signal TX, the transmission waves of the different beam patterns are output every cycle, so that it is possible to prevent the false angle information of the target from being derived due to the phase fold-back upon the azimuth calculation.

Then, the signal processing unit 18 performs pairing processing of pairing the peak signals of the UP and DOWN sections (step S107). For the hysteresis peak signals extracted in the hysteresis peak extraction processing (step S104) from all the peak signals derived in the processing of step S103, the pairing processing is performed between the hysteresis peak signal of the UP section and the hysteresis peak signal of the DOWN section. Also, for the stationary object peak signal extracted in the stationary object peak extraction processing (step S105), the pairing processing is performed between the stationary object peak signal of the UP section and the stationary object peak signal of the DOWN section. Also, for the other peak signals except for the hysteresis peak signals and stationary object peak signals of all the peak signals extracted in the peak extraction processing, the pairing processing is performed between the other peak signals of the UP section and the other peak signals of the DOWN section.

In the meantime, the pairing processing between the peak signal of the UP section and the peak signal of the DOWN section is performed through a calculation of using a Mahalanobis distance, for example. Specifically, a plurality of normal-paired data paired in a correct combination and mispaired data paired in an incorrect combination during the experimental pairing between the peak signal of the UP section and the peak signal of the DOWN section before the radar apparatus 1 is mounted on the vehicle CR is acquired. Then, from three parameter values of 'a difference of signal level values', 'a difference of angle values' and 'a difference of signal level values of angle spectra' between the peak signal of the UP section and the peak signal of the DOWN section in the plurality of normal-paired data, average values are derived for each of the three parameters of the plurality of normal-paired data and are then stored in the memory 182 in advance.

After the radar apparatus 1 is mounted on the vehicle CR, when the signal processing unit 18 derives the target information, it derives a Mahalanobis distance with an equation (4) by using the three parameter values of all combinations of the peak signals of the UP section and the peak signals of the DOWN section of the peaks signals of the FFT data acquired in this time processing and the average values for each of the three parameters of the plurality of normal-paired data. The signal processing unit 18 derives, as the normal-paired data, paired data of this time processing having a minimum Mahalanobis distance. Here, the Mahalanobis distance is a distance for one group expressed by a multivariable vector x=(x1, x2, x3) where an average μ=(μ1, μ2, 9μ3)$^T$ and a covariance matrix is E, and is derived by the equation (4). In the meantime, μ1, μ2 and μ3 indicate the three parameter values of the normal-paired data and x1, x2 and x3 indicate the three parameter values of the paired data of this time processing.

[Equation 4]

$$D_M(x) = \sqrt{(x-\mu)^T \Sigma^{-1} (x-\mu)} \qquad (4)$$

Then, the signal processing unit 18 derives a transverse distance, based on the longitudinal distance, relative distance and angle of the normal-paired data, by using the parameter values of the normal-paired data in the pairing processing and the equations (1) to (3).

Then, the signal processing unit 18 performs continuity determination processing of determining whether there is a temporally continuous relation between this time paired data paired in this time target deriving processing and previous time paired data paired in the previous time processing (step S108). Here, a case where there is a temporally continuous relation (there is a continuity) between both the paired data is a case where predicted paired data, which is obtained by predicting this time paired data based on previous time paired data, is generated and difference values of the longitudinal distances, transverse distances and relative speeds included in this time paired data and the predicted paired data are within predetermined values. In this case, it is determined that the target derived in this time processing and the target derived in the past processing are the same target. In the meantime, when the plurality of this time paired data is within the predetermined values, the signal processing unit 18 determines that this time paired data, which has the smallest difference value between the predicted paired data and this time paired data, has a temporally continuous relation with the target information of the previous time processing.

Also, when the difference values of the longitudinal distances, transverse distances and relative speeds included in this time paired data and the predicted paired data are not within predetermined values, the signal processing unit 18 determines that there is no temporally continuous relation (there is no continuity) between this time paired data and the previous time target information. The paired data for which it is determined that there is no continuity becomes a target (hereinafter, referred to as 'new paired data') that is first derived in this time target deriving processing. In the meantime, since the new paired data has no predicted paired data, the distance, relative speed, angle and signal level value of the new paired data become information on the distance, relative speed, angle and signal level value of one target in this time target deriving processing, in the filter processing and the like that will be described later. Also, when it is determined in the continuity determination that the continuity exists consecutively a predetermined number of times (i.e., when it is determined as the same target), the signal processing unit 18 also performs processing of deciding the detected target as a true target. The detailed continuity determination processing of this illustrative embodiment will be described later. Meanwhile, in the below, the variety of data such as the paired data to be used in the continuity determination processing may be also referred to as the target information.

Then, the signal processing unit 18 derives paired data corresponding to the moving object from the information of the speed of the vehicle CR and the relative speed of the paired data (step S109). By this processing, it is possible to determine the paired data that should be preferentially processed.

When there is a temporally continuous relation between this time paired data and the predicted paired data, the signal processing unit 18 performs filtering of the longitudinal distances, relative speeds, transverse distances and signal level values included in this time paired data and the predicted paired data (S110) and derives the filtered paired data (hereinafter, referred to as 'past correspondence paired data') as the target information of this time processing.

For example, when there is a temporally continuous relation between this time paired data and the predicted paired data, the signal processing unit 18 performs weighting of a value 0.75 for the transverse distance of the predicted paired data and weighting of value 0.25 for the transverse distance of this time paired data as regards the transverse distance and derives a sum of both values as a transverse distance of the past correspondence paired data of this time target deriving processing. In the meantime, the filtering processing is also performed for the longitudinal distance, relative speed and signal level value.

Then, the signal processing unit 18 performs up-down object processing of deriving a stationary object that is not necessary as regards the control of the vehicle CR (step S111). Specifically, the signal processing unit derives a stationary object (for example, a road marker of a cantilever or door-type provided above a roadway) having a position in a vehicle height direction of the vehicle CR that is higher than a predetermined height (for example, higher than the vehicle height of the vehicle CR). Also, the signal processing unit derives a stationary object (for example, a road rivet such as chatter bar having a reflection plate attached thereto that is provided at a center divider or curve of a road) having a position lower than the vehicle height of the vehicle CR. The target information of the stationary object derived as described above is removed in an unwanted matter removing processing (which will be described later) and is not output to the vehicle control device 2 from the radar apparatus 1, as the target information.

In processing (next time processing) that is performed next this time processing, the signal processing unit 18 derives predicted values (predicted longitudinal distance, predicted relative speed, predicted transverse distance and the like) of next time target data, which are used in the hysteresis peak extraction processing (step S104). Specifically, the signal processing unit derives 20 target information having a high priority when performing the vehicle control, calculates predicted values of the peak signals of the respective UP and DOWN sections and uses the predicted values in the hysteresis peak deriving processing of next time processing. Regarding the priority, when performing the ACC control, a target having a transverse position equivalent to an own traffic lane in which the vehicle CR is traveling and having a relatively short longitudinal distance to the vehicle CR has a high priority and a target having a transverse position equivalent to an adjacent traffic lane and a relatively long longitudinal distance to the vehicle CR has a low priority. Also, when performing the PCS control, a target having a relatively short time-to-collision ('TTC') has a high priority and a target having a relatively long TTC has a low priority.

Then, the signal processing unit 18 derives a transverse distance of the target corresponding to a curve radius from information on the curve radius of the own traffic lane in which the vehicle CR is traveling and the information on the longitudinal distance and transverse distance of the target. Specifically, the signal processing unit 18 derives the transverse distance (relative transverse distance) of the target with respect to the reference axis BL, which virtually changes in a linear or curved shape depending on the information on the rotating angle of the steering wheel that is input from the steering sensor 41 as a driver of the vehicle CR operates the steering wheel (not shown) of the vehicle CR, and derives a probability that the target exists on the own traffic lane from two-dimensional map data having relative transverse distance and longitudinal distance beforehand stored in the memory 182, as parameters, based on the relative transverse distance and longitudinal distance of the target with respect to the vehicle CR.

Then, the signal processing unit 18 performs processing of removing a target, which is not necessary to be output to the vehicle control device 2, for the target information derived in the past processing (step S114). For example, the signal processing unit 18 removes the target information derived in the up-down object processing of step S111, the target information of a ghost peak corresponding to a target that does not actually exist and caused due to an interference (intermodulation) between a peak signal corresponding to an actual target existing at a predetermined distance or larger and a switching noise of a DC-DC converter of a power supply device of the radar apparatus 1, and the like.

Subsequently, the signal processing unit 18 performs processing of combining a plurality of target information into target information corresponding to one object (step S115). For example, when the transmission wave is emitted from the transmission antenna 13 of the radar apparatus 1 and is reflected on the preceding vehicle, a plurality of reflected waves is received at the reception antenna 14. That is, the reflected waves from a plurality of reflection points of the same object arrive at the reception antenna 14. As a result, the signal processing unit 18 derives a plurality of the target information having different position information, based on the respective reflected waves. However, since the plurality of the target information is originally the target information on one vehicle, the signal processing unit combines the respective target information as one and treats the combined target information as the target information on the same object. For this reason, when the respective relative speeds of the plurality of the target information are substantially the same and the longitudinal distances and transverse distances of the respective target information are within the predetermined ranges, the signal processing unit 18 regards the plurality of the target information as the target information on the same object and performs combining processing of combining the plurality of the target information as the target information corresponding to one target.

Then, the signal processing unit 18 outputs the target information having a high priority with respect to the output to the vehicle control device 2 from the target information combining-processed in the step S115 to the vehicle control device 2.

1-3. Continuity Determination Processing

Figure 7:
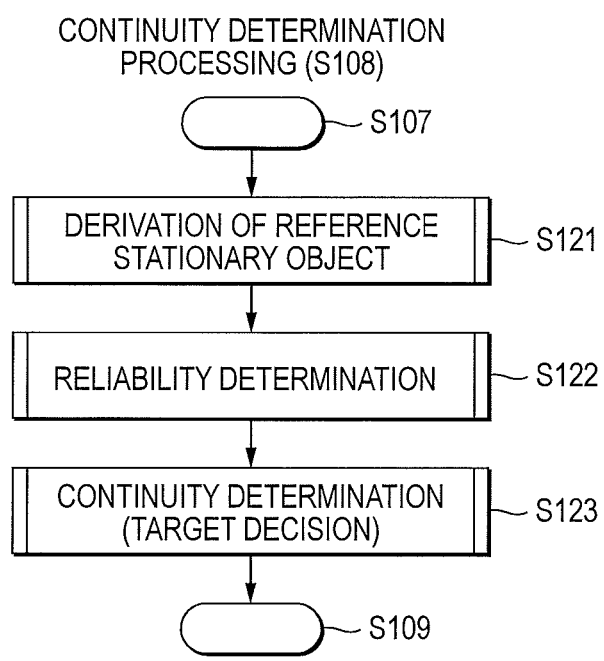
FIG. 7 is a flow chart showing continuity determining processing.

Subsequently, the continuity determination processing (step S108) of this illustrative embodiment is specifically described with reference to FIGS. 7 to 21. FIG. 7 is a flow chart showing the continuity determination processing. In this illustrative embodiment, the continuity determination processing is to determine whether, when deriving paired data of a moving object (hereinafter, referred to as a 'new moving object') as a new target, there is a possibility that the paired data has been falsely paired (mis-paired) for all the paired data. The determination of determining whether there is a possibility of the mis-pairing is performed by determining whether the new moving object exists in the vicinity of the stationary object. The determination of determining whether the new moving object exists in the vicinity of the stationary object is performed by deriving a stationary object (hereinafter, referred to as a 'reference stationary object') becoming a reference and determining whether the paired data of the new moving object is included in a predetermined range from the reference stationary object. For this reason, when the paired data of the new moving object is detected, the signal processing unit first derives the reference moving object (step S121). Then, the signal processing unit performs reliability determination processing of the paired data of the new moving object by using the reference moving object (step S122). The reliability determination processing is to determine whether there is a possibility that the detected paired data of the new moving object has been mis-paired. Then, the signal processing unit performs the continuity determination (target decision) processing, depending on a result of the reliability determination processing (step S123). The continuity determination (target decision) processing is to decide a target when a predetermined condition is satisfied upon the continuity determination. In the below, the respective processing is specifically described.

Figure 8:
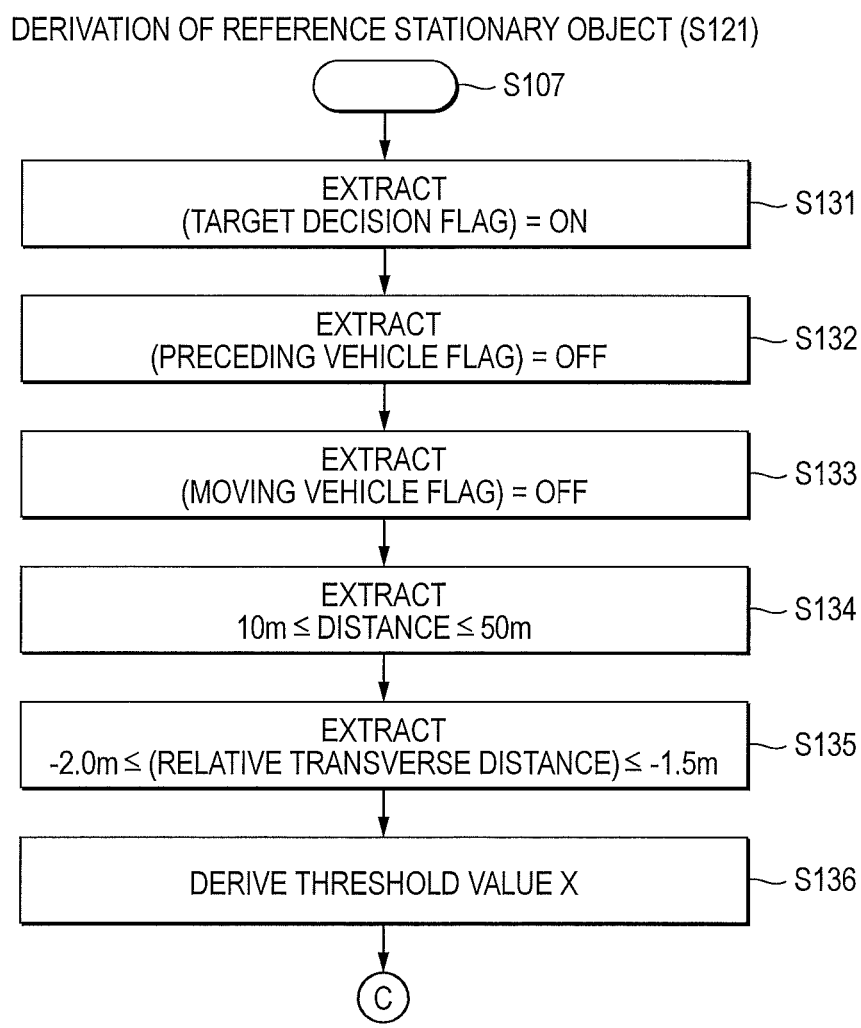
FIG. 8 is a flow chart showing processing of deriving a reference stationary object.
Figure 9:
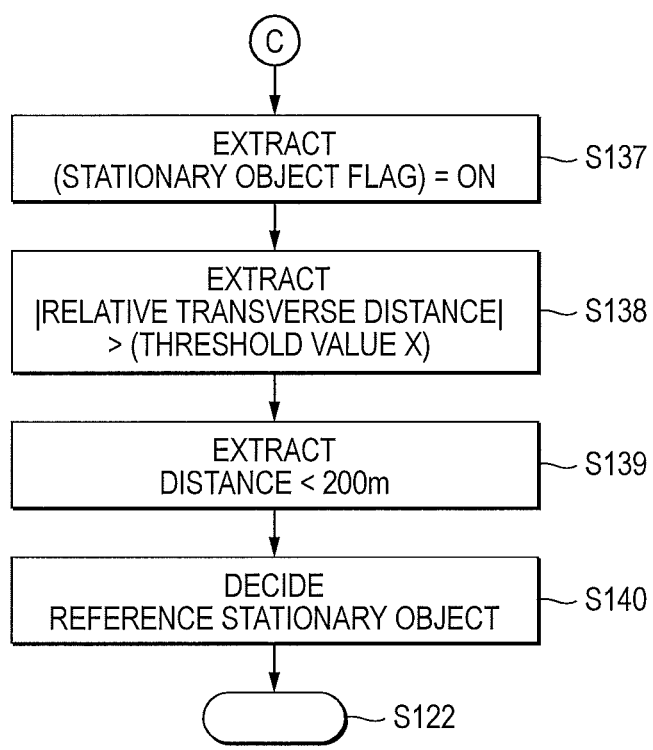
FIG. 9 is a flow chart showing the processing of deriving a reference stationary object.
Figure 10:
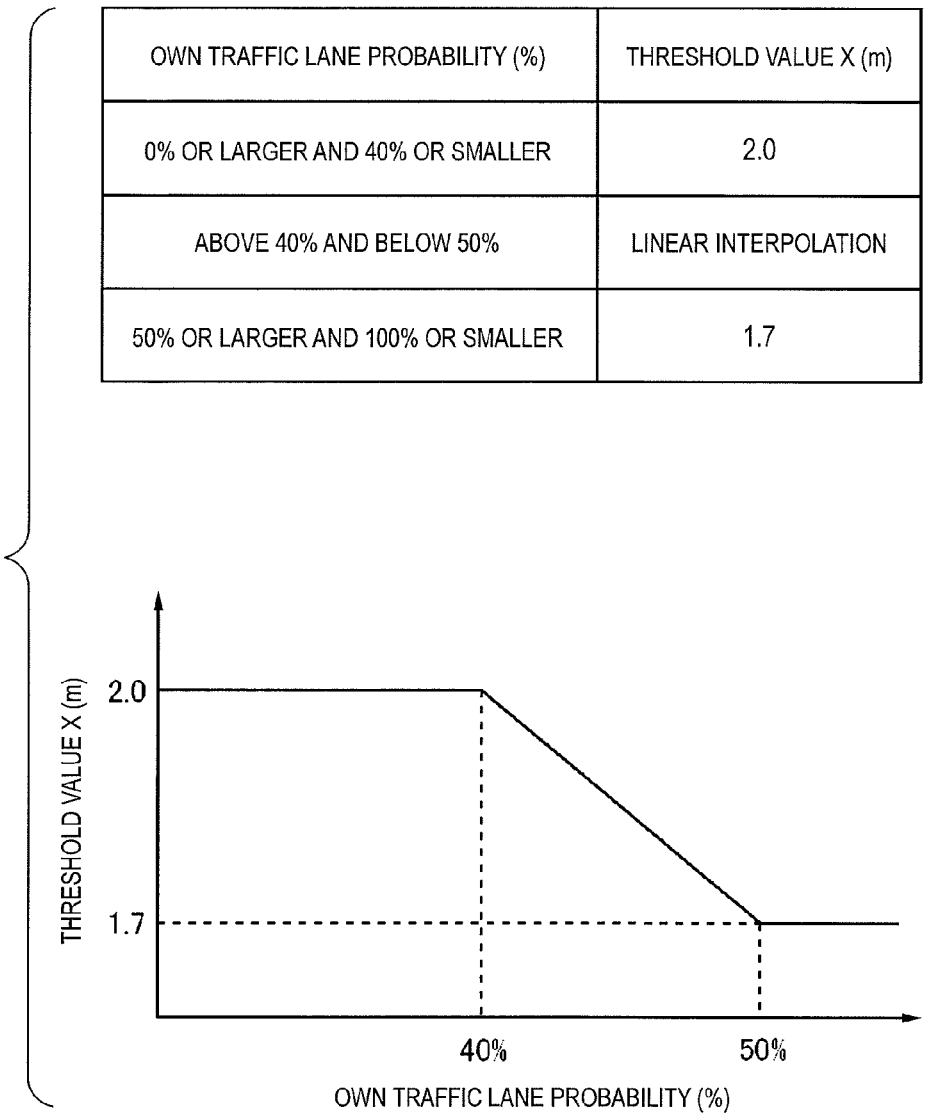
FIG. 10 illustrates the processing of deriving a reference stationary object.
Figure 11:
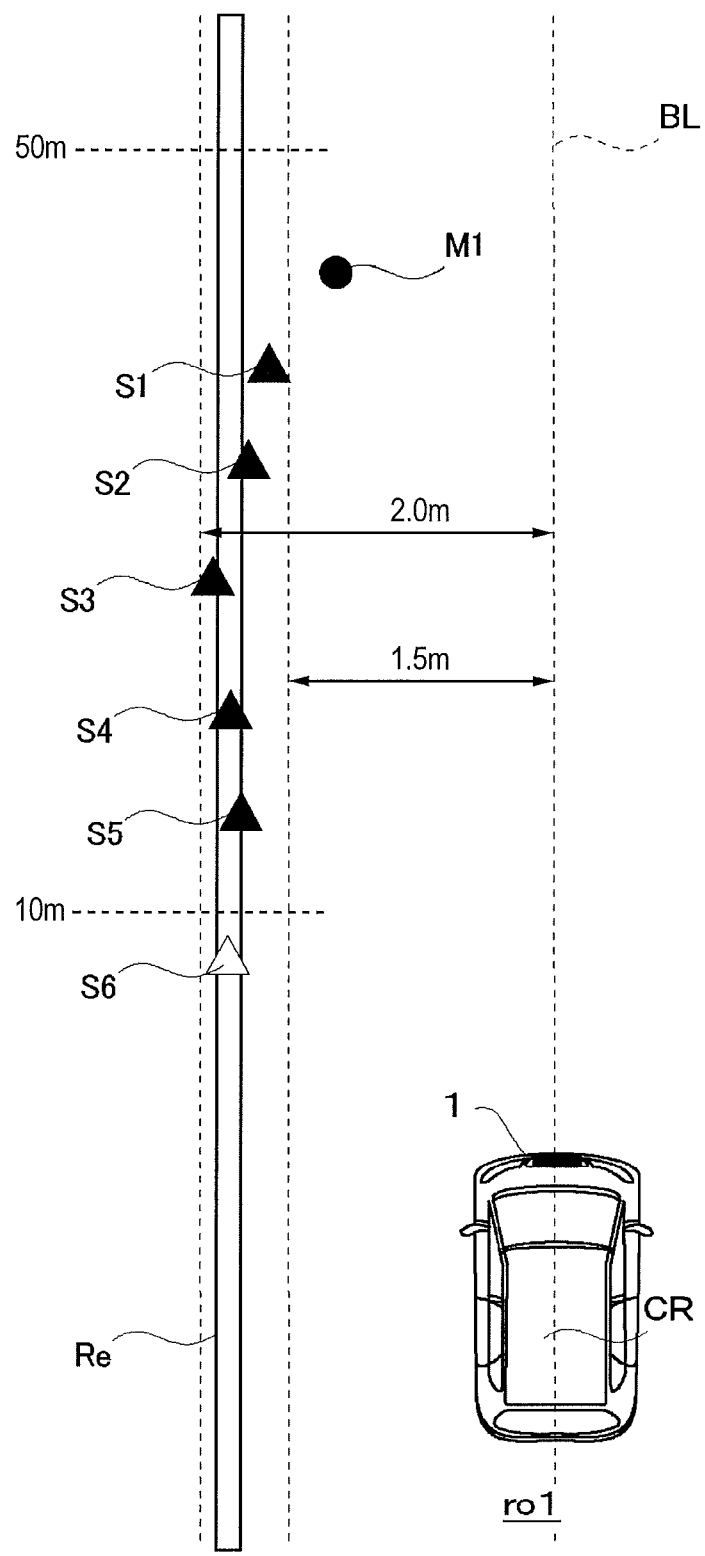
FIG. 11 illustrates the processing of deriving a reference stationary object.
Figure 12:
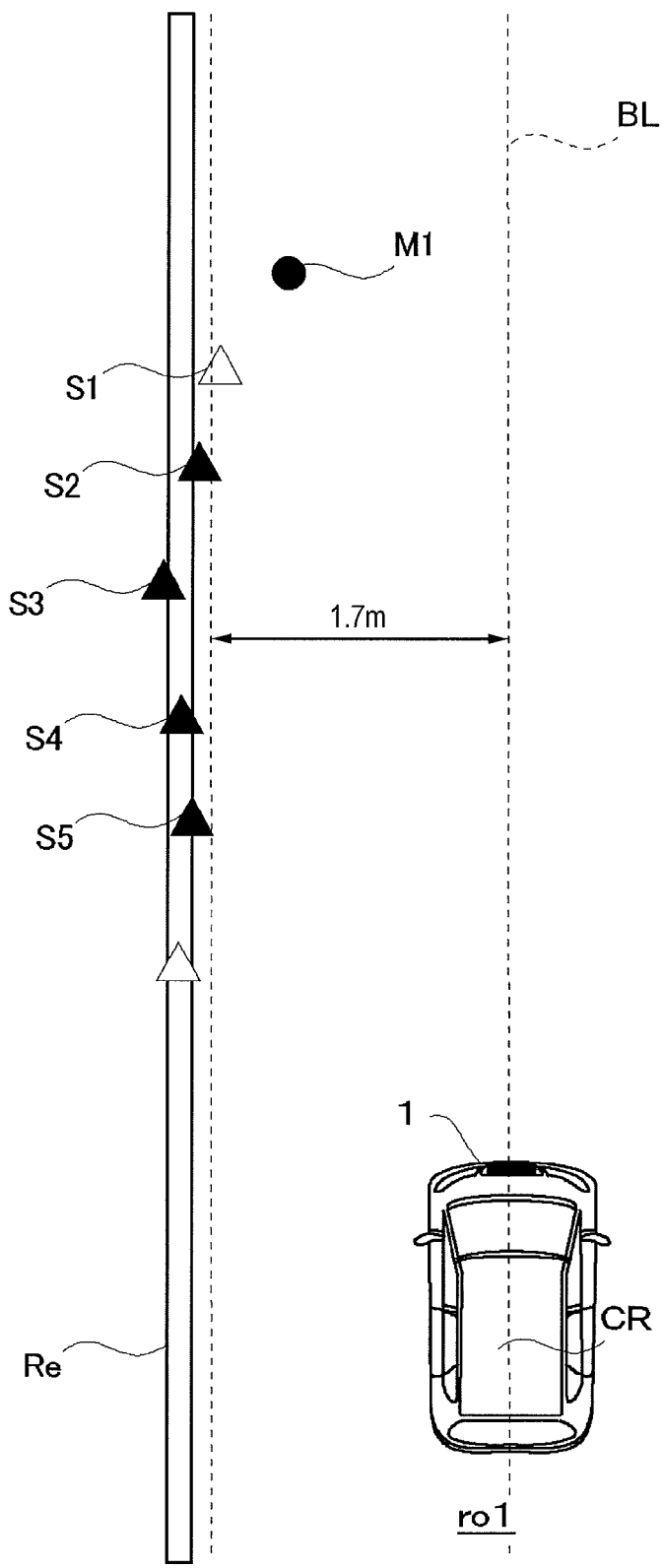
FIG. 12 illustrates the processing of deriving a reference stationary object.

First, the derivation of the reference stationary object is described with reference to FIGS. 8 to 12. FIGS. 8 and 9 are flow charts showing processing of deriving a stationary object and FIGS. 10 to 12 illustrate the processing of deriving a stationary object.

The signal processing unit 18 extracts the paired data of the stationary object from the targets derived in the past and extracts stationary object paired data of which a target decision flag is set to be ON (step S131). The target decision flag of an ON state indicates that the stationary object paired data thereof is the normal-paired data. The reason is that the reference stationary object is necessarily decided as a target of the stationary object so as to refer to the reference stationary object.

Then, the signal processing unit 18 extracts stationary object paired data of which a preceding vehicle flag is set to be OFF from the stationary object paired data of which the target decision flag is set to be ON (step S132). The preceding vehicle flag of an OFF state indicates that a target thereof is not a moving object. This condition is a condition for confirming the stationary object. Also, the signal processing unit 18 extracts stationary object paired data of which a moving vehicle flag is set to be OFF from the stationary object paired data of which the preceding vehicle flag is set to be OFF (step S133). This condition is also a condition that is the same as the case where the preceding vehicle flag is OFF.

Then, the signal processing unit 18 extracts stationary object paired data, which exists within a range from 10 m to 50 m from the own vehicle (the radar apparatus 1) in the vehicle traveling direction, from the extracted stationary object paired data (step S134). In the meantime, the distance from the own vehicle to the stationary object can be derived from the stationary object paired data. Then, the signal processing unit 18 extracts stationary object paired data having the relative transverse distance with respect to the own vehicle, which is within a range from −2.0 m to −1.5 m, from the extracted stationary object paired data (step S135). This is to extract the stationary object paired data within a range in which a road side object is thought to exist, considering a traffic lane width and the like. In the meantime, the relative transverse distance with respect to the own vehicle is a distance from a center of the own vehicle (the central axis of the radar apparatus 1) in the transverse direction, and a left side with respect to the traveling direction of the own vehicle is denoted with − (minus) and a right side is denoted with + (plus). The relative transverse distance can be also derived from the stationary object paired data.

In the meantime, the stationary object paired data that does not satisfy any one condition of steps S131 to S135 is not the reference stationary object. For this reason, when all the stationary object paired data decided as the target do not satisfy any one condition of steps S131 to S135, the processing of deriving a reference stationary object is not performed. Also, the sequence of steps S131 to S135 is not limited thereto and can be appropriately changed. Resultantly, it may be preferable if the stationary object paired data satisfying all the conditions can be extracted, and the sequence is not particularly limited and may be performed at the same time.

When the stationary object paired data satisfying the condition of step S135 is extracted, the signal processing unit derives a threshold value X (step S136). The threshold value X is a value considering the own traffic lane probability of the stationary object paired data and is a relative transverse distance that should not be derived as the reference stationary object. If the stationary object paired data close to the own vehicle is set as the reference stationary object, even when the moving object paired data at the periphery of the reference stationary object is a true target, it may be determined that the true target is a ghost. In order to avoid this situation, the stationary object paired data that is distant from the own vehicle in the transverse direction by a predetermined distance or larger is extracted as the reference stationary object. The threshold value X is a value that is set for the predetermined distance.

Here, a method of deriving the threshold value X is described with reference to FIG. 10. The signal processing unit 18 derives the own traffic lane probability, which is included in the stationary object paired data, for each of the stationary object paired data extracted in step S315 and holds the maximum probability from the derived own traffic lane probabilities. Then, the signal processing unit 18 derives the threshold value X corresponding to the held maximum probability. Specifically, as shown in FIG. 10, when the derived maximum own traffic lane probability is within a range from 0% to 40%, the threshold value X is 2.0 m and when the derived maximum own traffic lane probability is within a range from 50% to 100%, the threshold value X is 1.7 m. Also, when the derived maximum own traffic lane probability is above 40% and below 50%, the threshold value X is a linearly-interpolated value between 2.0 m and 1.7 m. Thereby, the threshold value X is derived. The threshold value X is derived for each of the extracted stationary object paired data.

Then, returning back to FIG. 9, the signal processing unit extracts stationary object paired data of which a stationary object flag is set to be ON from the extracted stationary object paired data (step S137). The reason is that the reference stationary object is conditioned as the stationary object. The signal processing unit extracts stationary object paired data having an absolute value of the relative transverse distance larger than the threshold value X from the stationary object paired data of which the stationary object flag is set to be ON (step S138). The relative transverse distance is a distance from the central axis of the radar apparatus 1 mounted on the vehicle to a position of the stationary object in the transverse direction, and an absolute value of the relative transverse distance and the above-derived threshold value X are compared. When the absolute value of the relative transverse distance is larger than the threshold value X, it indicates that the stationary object exists at a position more distant from the central axis of the radar apparatus 1 than the threshold value X. Thereby, it is possible to avoid setting the stationary object paired data existing in the vicinity of the own vehicle as the reference stationary object.

Then, the signal processing unit extracts stationary object paired data, which exists at a distance smaller than 200 m from the radar apparatus 1, from the stationary object paired data having an absolute value of the relative transverse distance larger than the threshold value X (step S139). This is to exclude a distant stationary object. From the stationary object paired data satisfying the conditions of the respective processing, the signal processing unit decides the stationary object paired data existing at the closest position to the own vehicle, i.e., having the smallest absolute value of the relative transverse distance, as the reference stationary object (step S140). Thereby, the reference stationary object is derived.

On the other hand, the stationary object paired data, which does not satisfy any one condition of steps S137 to S139, is not the reference stationary object. Thus, when the conditions are not satisfied, the processing of deriving a reference stationary object is not performed. Also, the sequence of steps S137 to S139 is not limited thereto and can be appropriately changed.

Here, the processing of deriving a reference stationary object is described with reference to FIGS. 11 and 12. As shown in FIGS. 11 and 12, the new moving object paired data M1 is detected in a situation where a road side object Re such as a guard rail and a tunnel wall is present at a left road side band of the traffic lance ro1 in which the own vehicle CR is traveling.

In FIG. 11, the stationary object paired data S1 to S6 satisfying the conditions of the respective flags is extracted as the execution result of steps S131 to S133. From the extracted stationary object paired data S1 to S6, the stationary object paired data S1 to S5 is extracted as the stationary object paired data existing at a distance of 10 m or longer and below 50 m from the radar apparatus 1. Also, from the stationary object paired data S1 to S5, the stationary object paired data S1 to S5 is extracted as the stationary object paired data existing at the relative transverse distance of 2.0 m or longer and below 1.5 m.

Then, in FIG. 12, a case is exemplified in which all the stationary object flags of the stationary object paired data S1 to S5 are ON and all the threshold values X of the stationary object paired data S1 to S5 are 1.7 m. The relative transverse distances of the respective stationary object paired data S1 to S5 and the threshold values X are compared and the stationary object paired data S2 to S4 having the relative transverse distance larger than 1.7 m is extracted. Then, from the extracted stationary object paired data S2 to S4, the stationary object paired data S2 existing at the position closest to the own vehicle is extracted as the reference stationary object.

Meanwhile, in the descriptions of FIGS. 8 to 12, the stationary object paired data existing at the left side of the own vehicle has been exemplified. However, the reference stationary object can be derived for the stationary object paired data existing at the right side of the own vehicle by the same method.

Figure 13:
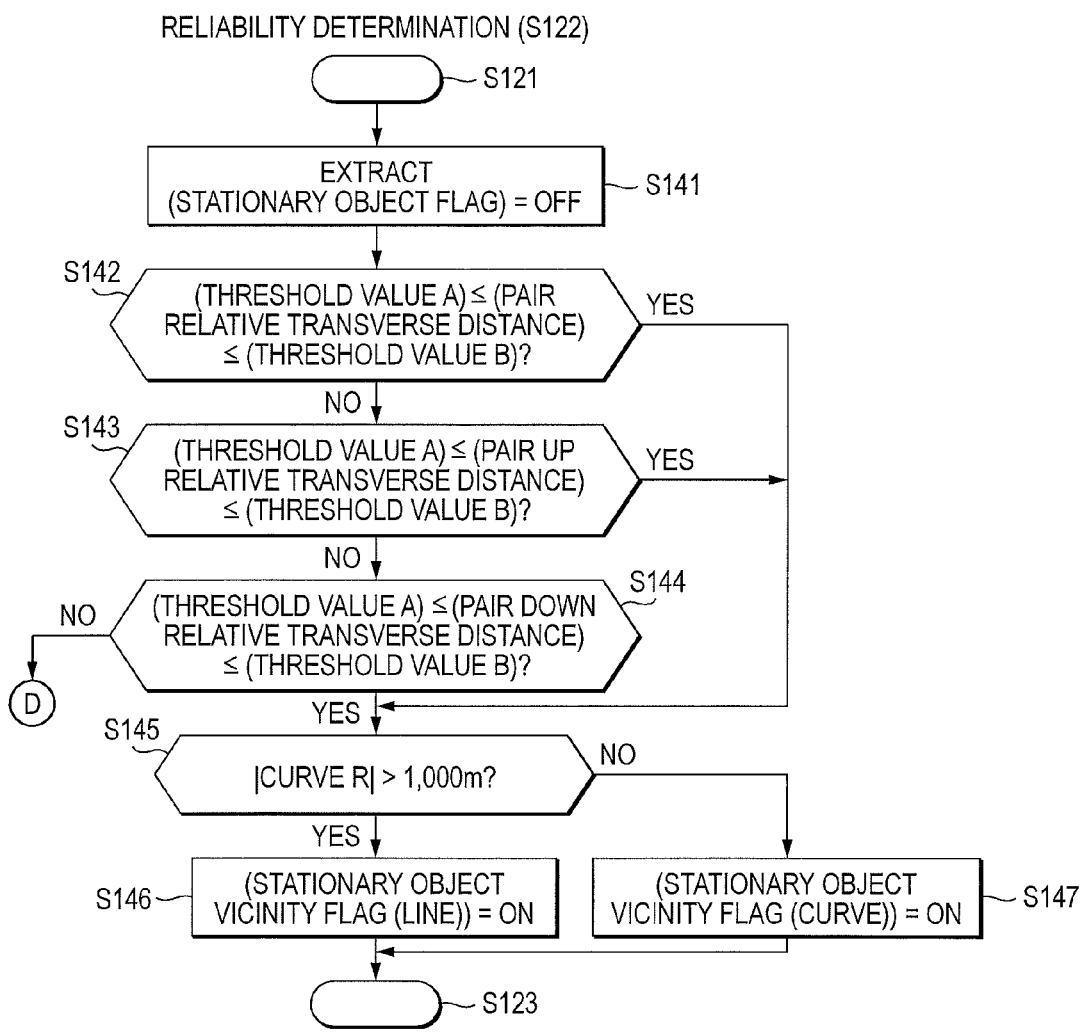
FIG. 13 is a flow chart showing reliability determining processing.

Returning back to FIG. 7, when the reference stationary object is derived, the signal processing unit 18 performs reliability determination (step S122). Thus, the detailed reliability determination processing is described with reference to FIG. 13. FIG. 13 is a flow chart showing the reliability determination processing.

The reliability determination processing is to determine whether there is a possibility that the paired data of the moving object detected as the new target is a false pairing. That is, the reliability is determined based on a possibility that the pairing is true or false. When there is a possibility of the false pairing, it is determined that the reliability is low. In this illustrative embodiment, it is determined whether the new moving object paired data exists within a predetermined range on the basis of the position of the reference stationary object. In the below, the processing is specifically described.

First, the signal processing unit 18 extracts the moving object paired data from the newly detected paired data. That is, the signal processing unit extracts the moving object paired data of which the stationary object flag is set to be OFF (step S141). When the stationary object flag is set to be OFF, it means that the corresponding paired data is the moving object paired data. Therefore, the signal processing unit proceeds to processing (steps S142 to S144) of determining whether a position of the new moving object paired data is included within a predetermined range.

Specifically, the signal processing unit 18 determines whether a pair relative transverse distance of the new moving object paired data is a threshold value A or larger and a threshold value B or smaller (step S142). The pair relative transverse distance is a relative transverse distance that is derived from the new moving object paired data and is information indicative of a distance from the central axis of the radar apparatus 1 in the transverse direction. The relative transverse distance is a distance that is derived on the basis of the longitudinal distance and angle information derived from the paired data of the new moving object.

Also, the threshold value A and the threshold value B are threshold values for determining whether the new moving object paired data exists in the vicinity of the reference stationary object. The threshold value A and the threshold value B are distances in the transverse direction on the basis of the position of the reference stationary object. The threshold value A is a distance in a direction getting away from the own vehicle and the threshold value B is a distance in a direction coming close to the own vehicle. In this illustrative embodiment, the threshold value A is 3.0 m and the threshold value B is 1.5 m. That is, the signal processing unit 18 determines whether the pair relative transverse distance is included in a range from 3.0 m in a direction getting away from the own vehicle to 1.5 m in a direction coming close to the own vehicle on the basis of the position of the reference stationary object. Thereby, it is determined whether the new moving object paired data is in the vicinity of the reference stationary object. When this condition is satisfied, the signal processing unit determines that the new moving object paired data is in the vicinity of the reference stationary object and proceeds to processing of step S145. In the meantime, the threshold value A and the threshold value B can be appropriately set.

When the pair relative transverse distance is not within the range from the threshold value A to the threshold value B, the signal processing unit 18 determines whether a pair UP relative transverse distance of the new moving object paired data is the threshold value A or larger and the threshold value B or smaller (step S143). The pair UP relative transverse distance is a relative transverse distance that is derived, based on the longitudinal distance and angle information derived from the peak signal of the UP section of the new moving object paired data. The processing of comparing the threshold value A and the threshold value B is the same as step S142. When this condition is satisfied, the signal processing unit determines that the new moving object paired data is in the vicinity of the reference stationary object and proceeds to processing of step S145.

On the other hand, when the pair UP relative transverse distance is not the threshold value A or larger and the threshold value B or smaller, the signal processing unit 18 determines whether a pair DOWN relative transverse distance of the new moving object paired data is the threshold value A or larger and the threshold value B or smaller (step S144). The pair DOWN relative transverse distance is a relative transverse distance that is derived based on the longitudinal distance and angle information derived from the peak signal of the DOWN section of the new moving object paired data. The processing of comparing the threshold value A and the threshold value B is the same as step S142. When this condition is satisfied, the signal processing unit determines that the new moving object paired data is in the vicinity of the reference stationary object and proceeds to processing of step S145.

That is, when any one of the pair relative transverse distance, the pair UP relative transverse distance and the pair DOWN relative transverse distance is the threshold value A or larger and the threshold value B or smaller, the signal processing unit determines that the new moving object paired data is in the vicinity of the reference stationary object and continues to perform the reliability determination processing. On the other hand, when all the relative transverse distances are not the threshold value A or larger and the threshold value B or smaller, the signal processing unit determines that the new moving object paired data is the moving object paired data that does not exist in the vicinity of the reference stationary object, and proceeds to the continuity determination processing without performing the reliability determination processing (D in FIG. 13).

Figure 14:
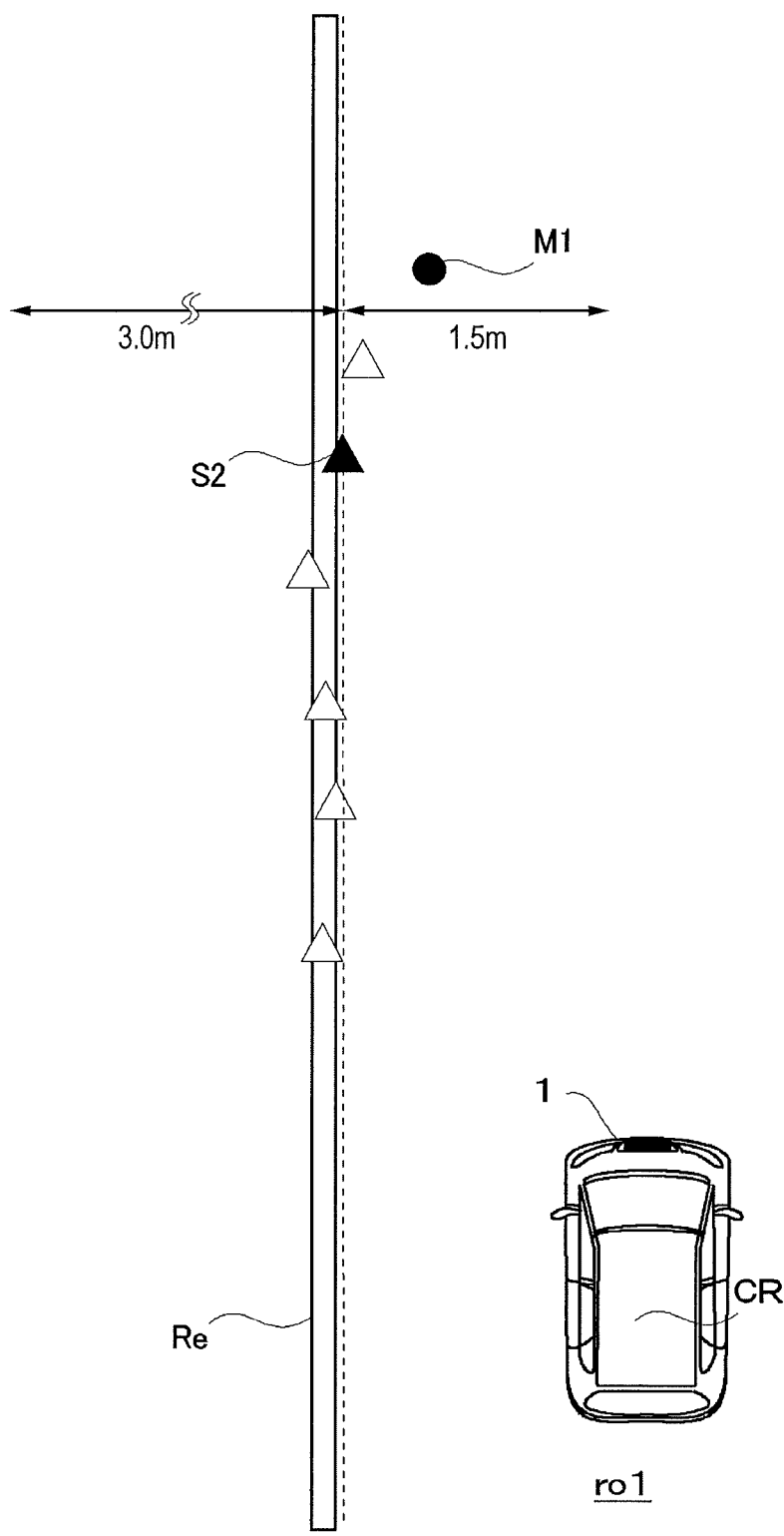
FIG. 14 illustrates the reliability determining processing.

Here, the processing of step S142 is described with reference to FIG. 14. FIG. 14 shows that the stationary object paired data S2 is derived as the reference stationary object and the threshold value A is 3.0 m and the threshold value B is 1.5 m on the basis of the position of the stationary object paired data S2. In the example of FIG. 14, the relative transverse distance of the new moving object paired data M1 is included in the range of 1.5 m from the position of the reference stationary object S2 towards the own vehicle, so that the condition is satisfied. In this case, it is thus determined that the new moving object paired data M1 exists in the vicinity of the stationary object. Steps S143 and S144 are also the same.

Returning back to FIG. 13, when it is determined that the new moving object paired data exists in the vicinity of the stationary object, the signal processing unit 18 determines whether the own traffic lane is a line or curve on the basis of the information of the curve radius (curve R) acquired from the steering sensor 41 (step S145). Specifically, the signal processing unit 18 determines whether an absolute value of the curve R is larger than 1,000 m. When it is determined that the curve R is larger than 1,000 m, the signal processing unit 18 determines that the own traffic lane is a line, and sets a stationary object vicinity flag (line) to be ON (step S146). On the other hand, when it is determined that the curve R is 1,000 m or smaller, the signal processing unit 18 determines that the own traffic lane is a curve, and sets a stationary object vicinity flag (curve) to be ON (step S147).

The case where the stationary object vicinity flag (line) is set to be ON indicates that the new moving object paired data exists in the vicinity of the stationary object and that there is a possibility that the new moving object paired data has been falsely paired. That is, it is a case where the signal processing unit 18 determines that the reliability of the new moving object paired data is low.

Figure 15:
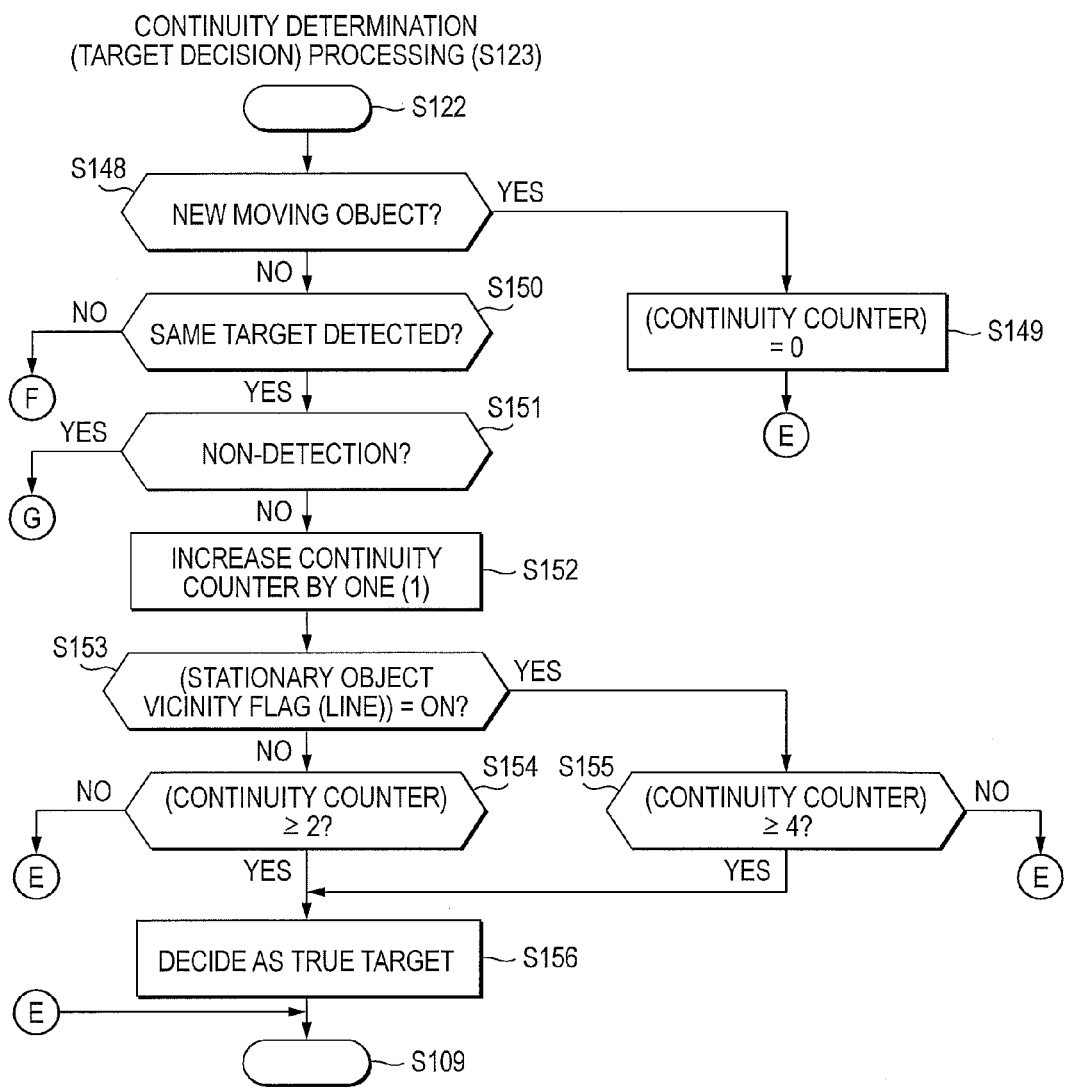
FIG. 15 is a flow chart showing continuity determining (target deciding) processing.
Figure 16:
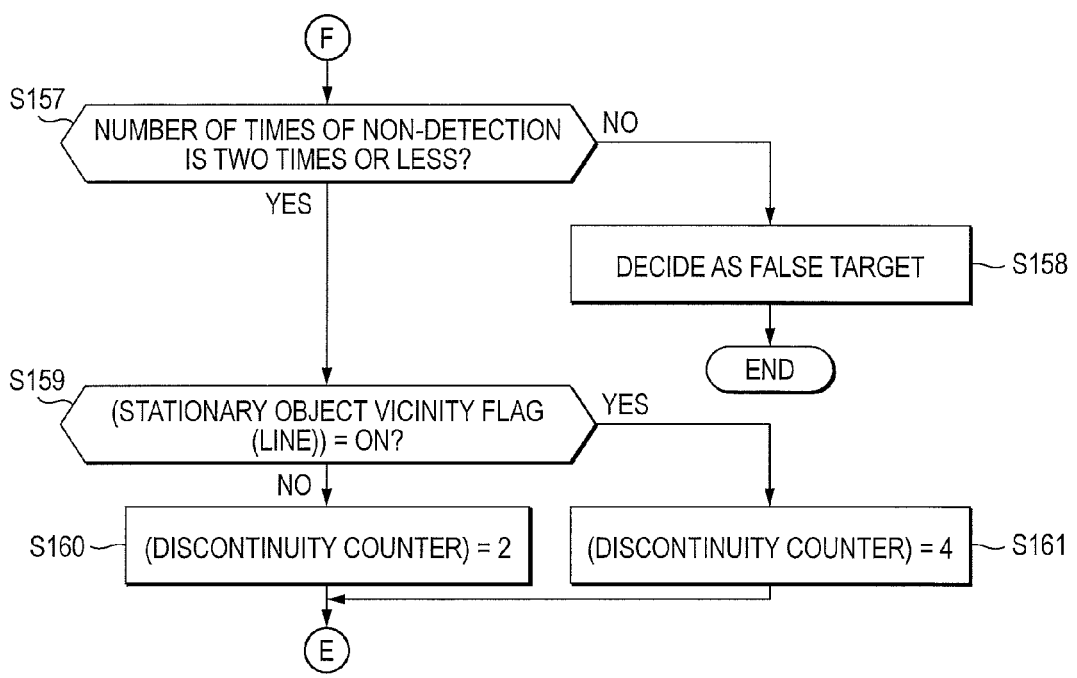
FIG. 16 is a flow chart showing the continuity determining (target deciding) processing.
Figure 17:
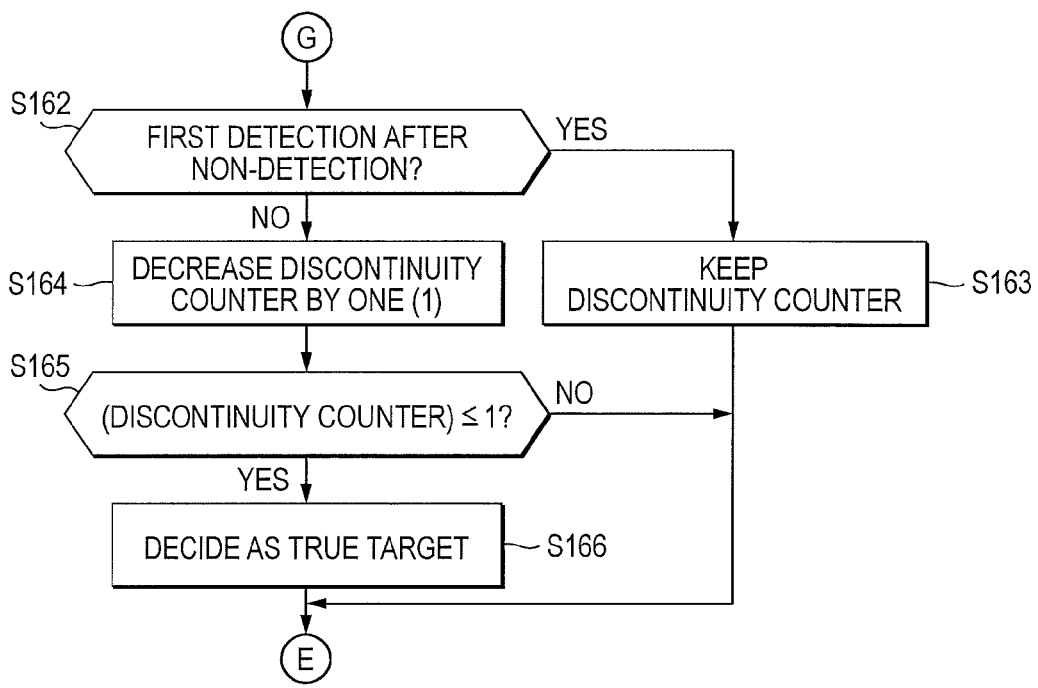
FIG. 17 is a flow chart showing the continuity determining (target deciding) processing.

Returning back to FIG. 7, when the reliability is determined, the signal processing unit 18 performs the continuity determination (target decision) processing (step S123). The detailed continuity determination (target decision) processing is described with reference to FIG. 15. FIG. 15 is a flow chart showing the continuity determination (target decision) processing. The outline of the continuity determination (target decision) processing has been described above. In this illustrative embodiment, however, the continuity determination (target decision) processing includes processing of, when it is determined that the moving object paired data has the continuity consecutively a predetermined number of times (that the moving object paired data is the same target), deciding that the moving object paired data is a true target. In the below, the detailed processing is described.

The signal processing unit 18 determines whether the new moving object paired data is detected in this time scanning (step S148). When it is determined that the new moving object paired data is detected, the signal processing unit 18 sets a continuity counter to be zero (0) (step S149) and proceeds to next processing (E in FIG. 15). The continuity counter is a counter that, when it is determined that there is a continuity between the moving object paired data detected by previous time scanning and the moving object paired data detected by this time scanning, increases the count by one (1).

When it is determined that the moving object paired data detected by this time scanning is not the new moving object paired data, the signal processing unit 18 determines whether the moving object paired data detected by this time scanning is the moving object paired data of the same target as the moving object paired data detected by the previous time scanning (step S150). Specifically, the signal processing unit 18 determines the continuity between the moving object paired data detected by this time scanning and the moving object paired data detected by the previous time scanning. The continuity determination method has been described above. When it is determined that there is the continuity between the respective moving object paired data, the signal processing unit 18 determines that the respective moving object paired data is the moving object paired data of the same target. In the meantime, a case where the moving object paired data of the same target is not detected indicates a case where there is no continuity and includes a case where the peak signal cannot be extracted by this time scanning and the paired data cannot be derived. In this case, the predicted paired data is used as temporary paired data (hereinafter, this processing is referred to as 'extrapolation').

When it is determined that it is not possible to detect the moving object paired data of the same target, the signal processing unit 18 proceeds to non-detection processing (F in FIG. 15). On the other hand, when it is determined that the moving object paired data of the same target is detected, the signal processing unit 18 determines whether there is a non-detection scanning (step S151). Specifically, the signal processing unit determines whether there is a case where the moving object paired data of the same target as the moving object paired data detected this time could not be detected even one time in the past scanning. This is to change the method of the target decision processing depending on whether there was non-detection in the past scanning. This determination is made by the signal processing unit 18, based on the information that indicates the non-detection and is included in the target information.

When there was the non-detection scanning, the signal processing unit 18 proceeds to non-detection processing (G in FIG. 15). On the other hand, when there was no non-detection scanning, the signal processing unit 18 increases the continuity counter by one (1) (step S152). That is, when the moving object paired data of the same target is consecutively detected without any non-detection after the new moving object paired data is detected, the signal processing unit increases the continuity counter by one (1). Thereby, the continuity counter becomes one (1).

Then, the signal processing unit 18 determines whether the stationary object vicinity flag (line) is set to be ON (step S153). When the moving object paired data is detected, the signal processing unit 18 performs the ON/OFF determination of the stationary object vicinity flag (line) every time. In this step, the signal processing unit checks whether the stationary object vicinity flag (line) of the moving object paired data detected in this time scanning is ON or OFF.

When the stationary object vicinity flag (line) is not set to be ON (is set to be OFF), the signal processing unit 18 determines whether the continuity counter is two (2) or larger (step S154). When the continuity counter is not two (2) or larger, the signal processing unit 18 proceeds to next processing (E in FIG. 15). On the other hand, when the continuity counter is two (2) or larger, the signal processing unit 18 sets a continuous pair decision flag to be ON. The continuous pair decision flag is set to be ON, so that the detected moving object paired data is decided as a true target (step S156).

On the other hand, when the stationary object vicinity flag (line) is set to be ON, the signal processing unit 18 determines whether the continuity counter is four (4) or larger (step S155). When the continuity counter is not four (4) or larger, the signal processing unit 18 proceeds to next processing (E in FIG. 15). On the other hand, when the continuity counter is four (4) or larger, the signal processing unit 18 sets the continuous pair decision flag to be ON and decides the detected moving object paired data as a true target (step S156).

That is, when the new moving object paired data is detected and the moving object paired data of the same target is detected consecutively without any non-detection, the signal processing unit 18 performs the target decision processing, based on the value of the continuity counter depending on whether the stationary object vicinity flag (line) is ON or OFF. More specifically, when the stationary object vicinity flag (line) is OFF, the possibility that the mis-pairing is caused due to the influence of the stationary object such as the road side object is low. Hence, when the moving object paired data of the same target is detected consecutively two times after the new moving object paired data is detected, the signal processing unit decides the same as a true target in accordance with the normal processing. In comparison to this, when the stationary object vicinity flag (line) is ON, since there is the possibility that the mis-pairing is caused due to the influence of the stationary object, the continuity determination is performed more strictly. That is, when the moving object paired data of the same target is detected consecutively four times after the new moving object paired data is detected, the signal processing unit decides the same as a true target while regarding that the possibility of the mis-pairing is low. In this way, in this illustrative embodiment, the method of determining the target decision is changed depending on whether there is the possibility of the mis-pairing.

Also, when it is not possible to detect the moving object paired data of the same target by the scanning after detecting the new moving object paired data (No in step S150), if the moving object paired data of the same target is again detected by a further scanning thereafter, the continuity determination (target decision) processing is performed by a method different from the above method. In this case, the continuity determination (target decision) processing is performed using a discontinuity counter. The discontinuity counter is a counter that increases the count by one (1) when there is no continuity between the moving object paired data detected by the previous time scanning and the moving object paired data detected by this time scanning and decreases the count by one (1) when it is determined that there is the continuity. The discontinuity counter is originally a counter that, when the count value becomes a predetermined value or larger, determines that the target does not exist any more and loses the target.

When the moving object paired data of the same target cannot be detected by the scanning after detecting the new moving object paired data (i.e., when the paired data is extrapolated), the signal processing unit determines whether the number of times of the non-detection is two times or less (step S157). In the continuity determination (target decision) processing, when the moving object paired data of the same target is not detected three times or more by the scanning after detecting the new moving object paired data, the signal processing unit decides the corresponding target as a false target (i.e., a ghost) (step S158), erases the data and ends the processing.

When the number of times of the non-detection is two times or less, the signal processing unit 18 determines whether the stationary object vicinity flag (line) is ON (step S159). Regarding the stationary object vicinity flag (line), a result of the stationary object vicinity flag (line) determined on the basis of the predicted paired data used by the extrapolation may be used and a result of the stationary object vicinity flag (line) detected most recently may be used. When the stationary object vicinity flag (line) is set to be OFF, the signal processing unit 18 sets the discontinuity counter to be two (2) (step S160) and proceeds to next processing (E in FIG. 16). On the other hand, when the stationary object vicinity flag (line) is set to be ON, the signal processing unit 18 sets the discontinuity counter to be four (4) (step S1610) and proceeds to next processing (E in FIG. 16).

When the moving object paired data of the same target has not been detected in the past scanning although it is detected (No in step S151), the signal processing unit 18 determines whether the detected moving object paired data is the moving object paired data detected in a first scanning after the non-detection (step S162). Regarding this, the signal processing unit may determine whether the previous time scanning results in the non-detection. When the previous time scanning results in the non-detection, the signal processing unit 18 keeps the discontinuity counter (step S163) and proceeds to next processing (E in FIG. 17). That is, the signal processing unit keeps the value of the discontinuity counter at two (2) or four (4) in the processing after the non-detection.

On the other hand, when the previous time scanning does not result in the non-detection, the signal processing unit 18 decreases the discontinuity counter by one (1) (step S164). That is, when the moving object paired data is detected in the scanning after the non-detection and the moving object paired data of the same target is also detected in the consecutive scanning, the signal processing unit decreases the discontinuity counter by one (1). Then, the signal processing unit 18 determines whether the discontinuity counter is one (1) or smaller (step S165). When the discontinuity counter is not one (1) or smaller, the signal processing unit proceeds to next processing (E in FIG. 18). When the discontinuity counter is one (1) or smaller, the signal processing unit sets the continuous pair decision flag to be ON. The continuous pair decision flag becomes ON, so that the detected moving object paired data is decided as a true target (step S166).

In this way, in the continuity determination (target decision) processing, when the moving object paired data is not once detected, if the moving object paired data is then detected in the scanning thereafter, the signal processing unit determines the continuity by using the discontinuity counter. When the moving object paired data detected consecutively the predetermined number of times has the continuity (when it is the same target), the moving object paired data is decided as a true target. The predetermined number of times is changed by the ON/OFF state of the stationary object vicinity flag (line). That is, in this illustrative embodiment, the method of determining the target decision is changed depending on whether there is the possibility of the mis-pairing.

Here, the continuity determination (target decision) processing is specifically described with reference to FIGS. 18 to 21. FIG. 18 shows a case where the stationary object vicinity flag (line) is OFF and the continuity is taken from the detection of the new moving object paired data without the non-detection during the processing. In FIG. 18, ● indicates this time scanned data (third target paired data), ■ indicates data before one scanning (second target paired data) and 0 indicates data before two scanning (first target paired data). When the new moving object paired data (the first target paired data) is detected, the signal processing unit 18 sets the continuity counter to be zero (0). Then, the signal processing unit 18 detects the second target paired data in a next scanning, and sets the continuity counter to be 1 when it is determined that there is the continuity between the second target paired data and the first target paired data. The signal processing unit 18 further detects the third target paired data in a next scanning, and sets the continuity counter to be 2 when it is determined that there is the continuity between the third target paired data and the second target paired data. Then, when it is determined that the stationary object vicinity flag (line) of the third target paired data is OFF, the signal processing unit 18 sets the continuous pair decision flag to be ON. Thereby, the third target paired data that is detected based on the recent this time scanned data is decided as a true target.

Figure 19:
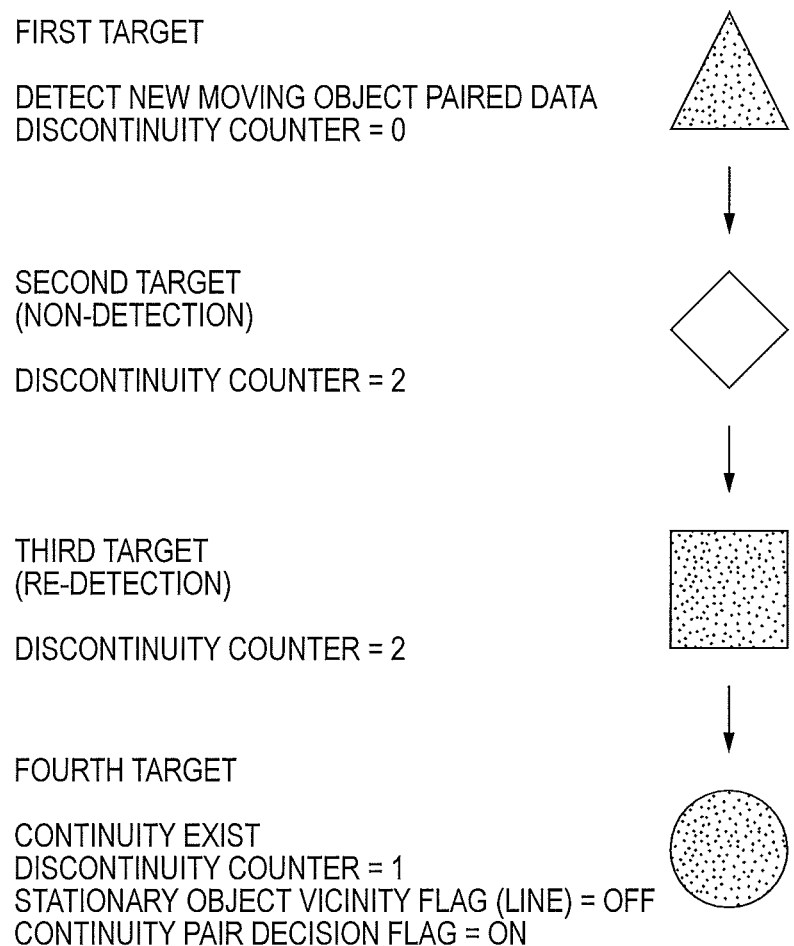
FIG. 19 is a flow chart showing the continuity determining (target deciding) processing.

Also, FIG. 19 shows a case where the stationary object vicinity flag (line) is OFF and the non-detection occurs during the processing. In FIG. 19, ● indicates this time scanned data (fourth target paired data), ■ indicates data before one scanning (third target paired data), 0 indicates data before two scanning (second target paired data) and ▲ indicates data before three scanning (first target paired data). In the meantime, the second target paired data is predicted paired data (hereinafter, referred to as 'extrapolated data') that is obtained by predicting next time data from the first target paired data by the extrapolation due to the non-detection. When the new moving object paired data (the first target paired data) is detected, the signal processing unit 18 sets the discontinuity counter to be zero (0). Then, the signal processing unit 18 sets the discontinuity counter to be 2 when it is not possible to detect the second target paired data having the continuity from the first target paired data in a next time scanning. When the third target paired data having the continuity is further detected from the second target paired data (in this case, the extrapolated data) in a next time scanning, the signal processing unit keeps the discontinuity counter at two (2). Then, the signal processing unit 18 further detects the fourth target paired data in a next scanning, and decreases the continuity counter to one (1) when it is determined that there is the continuity between the fourth target paired data and the third target paired data. Then, when it is determined that the stationary object vicinity flag (line) of the fourth target paired data is OFF, the signal processing unit 18 sets the continuous pair decision flag to be ON. Thereby, the fourth target paired data that is detected based on the recent this time scanned data is decided as a true target.

Also, FIG. 20 shows a case where the stationary object vicinity flag (line) is ON and the continuity is taken from the detection of the new moving object paired data without the non-detection during the processing. In FIG. 20, ● indicates this time scanned data (fifth target paired data), ■ indicates data before one scanning (fourth target paired data), ♦ indicates data before two scanning (third target paired data), ▲ indicates data before three scanning (second target paired data) and ▼ indicates data before four scanning (first target paired data). When the new moving object paired data (the first target paired data) is detected, the signal processing unit 18 sets the continuity counter to be zero (0). Then, the signal processing unit 18 detects the second target paired data in a next scanning, and sets the continuity counter to be one (1) when it is determined that there is the continuity between the second target paired data and the first target paired data. The signal processing unit 18 detects the third target paired data in a next scanning, and sets the continuity counter to be two (2) when it is determined that there is the continuity between the third target paired data and the second target paired data. Here, since the stationary object vicinity flag (line) is ON, the signal processing unit 18 does not perform the target decision. The signal processing unit 18 further detects the fourth target paired data in a next scanning, and sets the continuity counter to be three (3) when it is determined that there is the continuity between the fourth target paired data and the third target paired data. Then, the signal processing unit 18 detects the fifth target paired data in this time scanning, and sets the continuity counter to be four (4) when it is determined that there is the continuity between the fifth target paired data and the fourth target paired data. Then, when it is determined that the stationary object vicinity flag (line) is ON, the signal processing unit 18 sets the continuous pair decision flag to be ON. Thereby, the fifth target paired data that is detected based on the recent this time scanned data is decided as a true target.

Also, FIG. 21 shows a case where the stationary object vicinity flag (line) is ON and the non-detection occurs during the processing. In FIG. 21, ● indicates this time scanned data (sixth target paired data), ■ indicates data before one scanning (fifth target paired data), • indicates data before two scanning (fourth target paired data), ▲ indicates data before three scanning (third target paired data), ∇ indicates data before four scanning (second target paired data) and ★ indicates data before five scanning (first target paired data). In the meantime, regarding the second target, the extrapolated data is used due to the non-detection.

When the new moving object paired data (the first target paired data) is detected, the signal processing unit 18 sets the discontinuity counter to be zero (0). Then, the signal processing unit 18 sets the discontinuity counter to be four (4) when it is not possible to detect the second target paired data having the continuity from the first target paired data in a next time scanning. When the third target paired data having the continuity is further detected from the second target paired data (in this case, the extrapolated data) in a next time scanning, the signal processing unit keeps the discontinuity counter at four (4). Then, the signal processing unit 18 further detects the fourth target paired data in a next scanning, and decreases the continuity counter to three (3) when it is determined that there is the continuity between the fourth target paired data and the third target paired data. Then, the signal processing unit 18 further detects the fifth target paired data in a next scanning, and decreases the continuity counter to two (2) when it is determined that there is the continuity between the fifth target paired data and the fourth target paired data. Then, the signal processing unit 18 further detects the sixth target paired data in a next scanning, and decreases the continuity counter to one (1) when it is determined that there is the continuity between the sixth target paired data and the fifth target paired data. Then, when it is determined that the stationary object vicinity flag (line) of the sixth target paired data is ON, the signal processing unit 18 sets the continuous pair decision flag to be ON. Thereby, the sixth target paired data that is detected based on the recent this time scanned data is decided as a true target.

Meanwhile, in general, a possibility that the mis-pairing will be made consecutively five times is low. However, there is a possibility that the mis-pairing will be made consecutively three times. For this reason, when the continuity determination (target decision) processing is performed for only the detected third moving object paired data, if the mis-pairing is made consecutively three times, the corresponding data may be falsely decided as a true target. In contrast, in this illustrative embodiment, the continuity determination (target decision) processing is performed at least for the detected fifth moving object paired data at a condition where there is the possibility of the mis-pairing, so that a false target can be decided. Thereby, it is possible to avoid the false detection of the ghost.

2. Second Illustrative Embodiment

In the below, a second illustrative embodiment is described. The second illustrative embodiment is different from the first illustrative embodiment as regards the continuity determination processing. The configuration of the vehicle control system and the other processing are the same as the first illustrative embodiment. Thus, the continuity determination processing is mainly described in the below.

2-1. Continuity Determination Processing

Figure 22:
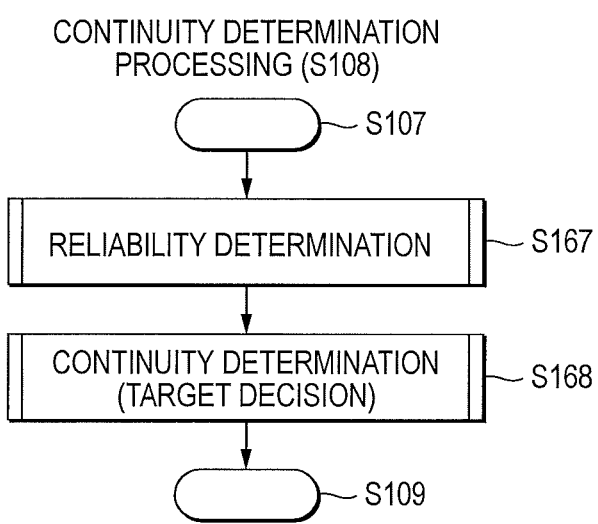
FIG. 22 is a flow chart showing continuity determining processing.

The detailed continuity determination processing (step S108) of the second illustrative embodiment is described with reference to FIGS. 22 to 25. FIG. 22 is a flow chart showing the continuity determination processing. In the continuity determination processing of this illustrative embodiment, when a level difference of the reception signals between the consecutively derived moving object paired data is large, processing of determining that there is a possibility that the derived moving object paired data is is-paired is performed and the continuity determination is performed depending on a result of the determination. That is, as shown in FIG. 22, in the continuity determination processing, the signal processing unit first performs the reliability determination processing of the detected moving object (step S167). Then, the signal processing unit performs the continuity determination (target decision) processing, depending on a result of the reliability determination (step S168). In the below, the respective processing is specifically described.

Figure 23:
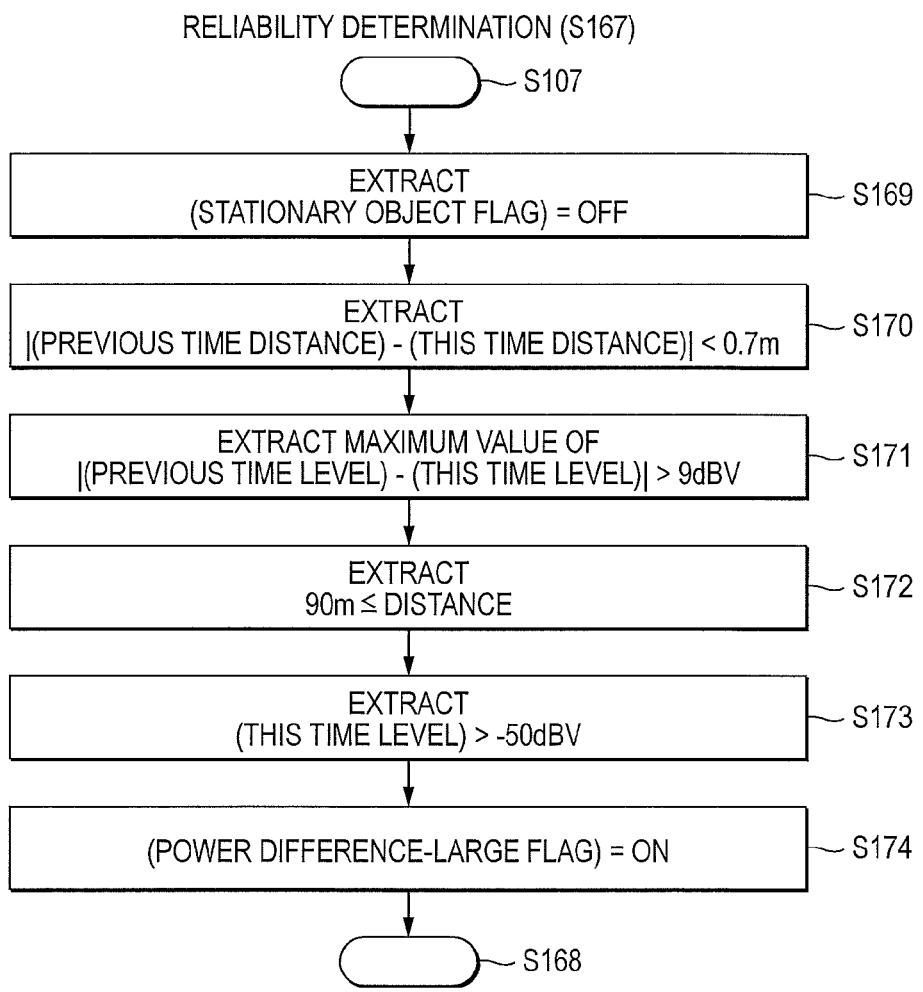
FIG. 23 is a flow chart showing reliability determining processing.

FIG. 23 is a flow chart showing the reliability determination processing. The reliability determination processing is to determine whether there is a possibility that the detected moving object paired data is mis-paired. First, the signal processing unit 18 extracts moving object paired data from the paired data detected in the respective scanning. That is, the signal processing unit extracts the paired data of which the stationary object flag is set to be OFF (step S169).

Then, the signal processing unit 18 extracts moving object paired data of which an absolute value of a difference between the previous time distance and this time distance is smaller than 0.7 m from the extracted moving object paired data (step S170). That is, when the difference between the previous time distance and this time distance is too large, a possibility that the moving object paired data is not the paired data of the same target is high. This processing is performed by deriving a difference between the longitudinal distance or transverse distance derived from the previous time moving object paired data and the longitudinal distance or transverse distance derived from this time moving object paired data.

Then, the signal processing unit 18 extracts moving object paired data of which a maximum value of absolute values of differences between the previous levels and this time levels is larger than 9 dBV from the extracted moving object paired data (step S171). Specifically, the signal processing unit 18 derives absolute values of differences between the signal levels of the angle spectra that are derived from the UP or DOWN peak signals of the previous time moving object paired data and the signal levels of the angle spectra that are derived from the UP or DOWN peak signals of this time moving object paired data and determines whether a maximum value of the absolute values is larger than 9 dBV. That is, for the comparison, the signal processing unit uses a combination having the largest difference value of four combinations, i.e., the previous time UP peak signal and this time UP peak signal, the previous time UP peak signal and this time DOWN peak signal, the previous time DOWN peak signal and this time UP peak signal and the previous time DOWN peak signal and this time DOWN peak signal. The reason is that the moving object paired data satisfying the corresponding condition has a large difference between the signal level received in the previous time processing and the signal level received in this time processing and has a possibility of the mis-pairing.

Then, the signal processing unit 18 extracts moving object paired data that is distant from the own vehicle (the radar apparatus 1) by 90 m or larger from the extracted moving object paired data (step S172). This is to prevent a false determination because the target distant from the own vehicle by 90 m or larger has a large deviation of the reception level.

Then, the signal processing unit 18 extracts moving object paired data of which the reception level derived in this time processing is larger than −50 dBV from the extracted moving object paired data (step S173). Specifically, the signal processing unit extracts the moving object paired data of which the signal level of the angle spectrum derived from this time moving object paired data is larger than −50 dBV. This is to exclude a peak that does not reach a predetermined level because the corresponding peak may be a noise.

Then, when the moving object paired data satisfying all the conditions is extracted, the signal processing unit sets a power difference-large flag to be ON for the moving object paired data (step S174). When the power difference-large flag is set to be ON, it indicates that there is a possibility that the moving object paired data is mis-paired. That is, it indicates a case where the signal processing unit 18 determines that the reliability of the detected moving object paired data is low. In the meantime, the values of the respective conditions are not limited to the above-described values and can be appropriately set.

Figure 24:
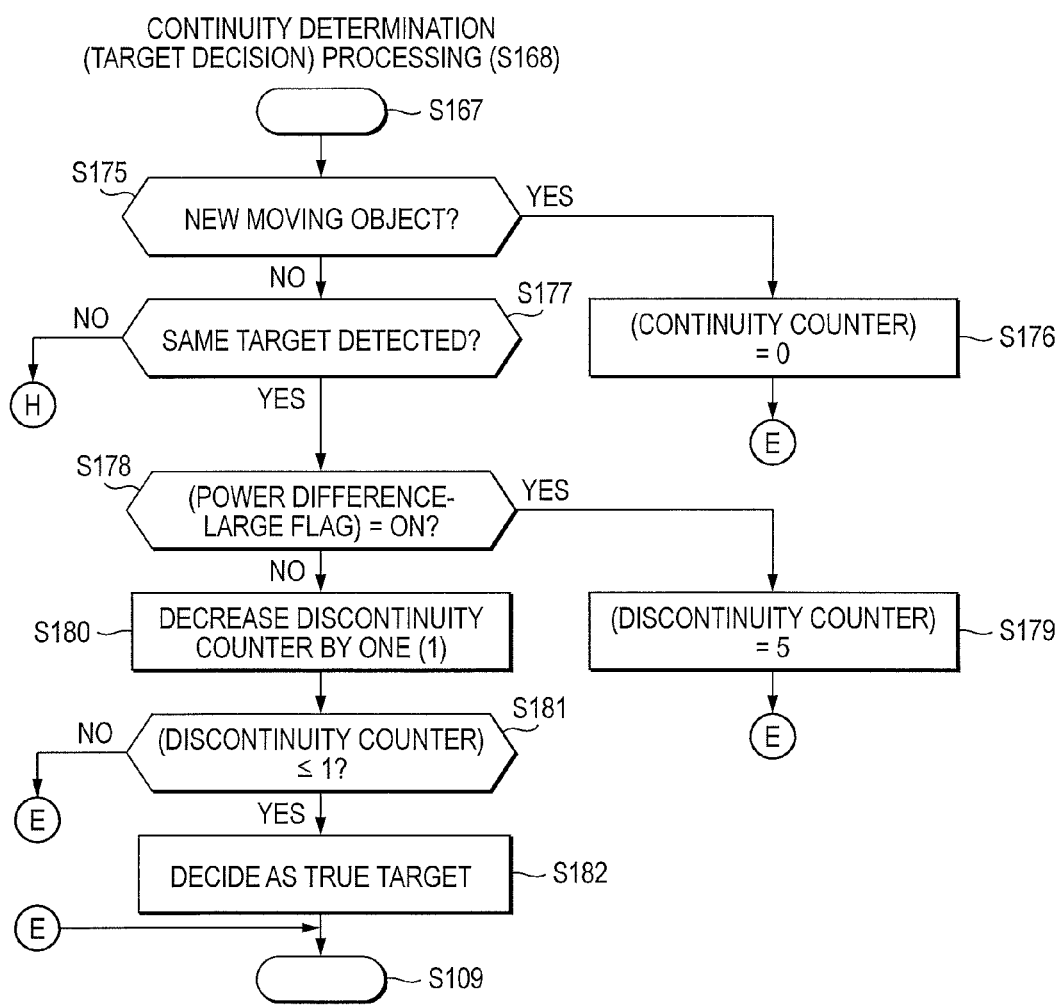
FIG. 24 is a flow chart showing continuity determining (target deciding) processing.
Figure 25:
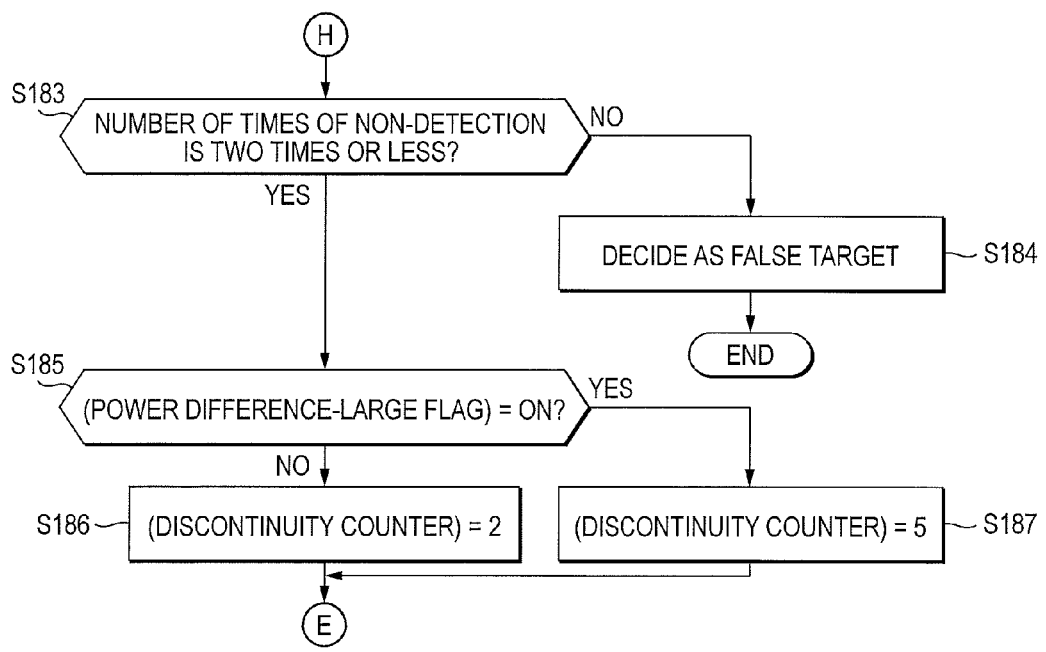
FIG. 25 is a flow chart showing the continuity determining (target deciding) processing.

Returning back to FIG. 22, when the reliability is determined, the signal processing unit 18 then performs the continuity determination (target decision) processing (step S168). The detailed continuity determination (target decision) processing is described with reference to FIG. 24. FIG. 24 is a flow chart showing the continuity determination (target decision) processing. An outline of the continuity determination processing is the same as the first illustrative embodiment. Thus, a difference between the second illustrative embodiment and the first illustrative embodiment is mainly described in the below.

First, the signal processing unit 18 determines whether the paired data detected in this time scanning is the new moving object paired data (step S175). When the paired data detected in this time scanning is the new moving object paired data, the signal processing unit 18 sets the continuity counter to be zero (0) (step S176). On the other hand, when the paired data detected in this time scanning is not the new moving object paired data, the signal processing unit 18 determines whether the detected moving object paired data is the moving object paired data of the same target as the moving object paired data detected in the previous time scanning (step S177). The respective processing is the same as the first illustrative embodiment.

When the detected moving object paired data is the moving object paired data of the same target, the signal processing unit 18 determines whether the power difference-large flag is set to be ON (step S178). In the meantime, this determination processing is performed only when the new moving object paired data is detected and then the power difference-large flag has never been set to be ON. When the power difference-large flag is set to be ON, the signal processing unit 18 sets the discontinuity counter to be five (5) (step S179). In this illustrative embodiment, since the continuity determination is made after the new moving object paired data is detected and then the moving object paired data is detected, the continuity determination processing is performed using the discontinuity counter without using the continuity counter.

In contrast, when the paired data of the same target is detected at the state where the power difference-large flag is set to be ON, the signal processing unit decreases the discontinuity counter by one (1) (step S180). Then, the signal processing unit 18 determines whether the discontinuity counter is one (1) or smaller (step S181). When the discontinuity counter is not one (1) or smaller, the signal processing unit proceeds to next processing (E in FIG. 24). When the discontinuity counter is 1 or smaller, the signal processing unit sets the continuous pair decision flag to be ON and decides the detected paired data as a true target (step S182). The steps S180 to S182 can be performed by the same method as the first illustrative embodiment.

In the meantime, when the paired data of the same target is not detected at the state where the power difference-large flag is set to be ON (No in step S177), the signal processing unit determines whether the number of times of the non-detection is two times or less (step S183). When the paired data of the same target is not detected three times or more, the signal processing unit decides the corresponding target as a false target (i.e., a ghost) (step S184), erases the data and ends the processing.

When the number of times of the non-detection is two times or less, the signal processing unit 18 determines whether the power difference-large flag has been already set to be ON, by the determination based on the paired data detected in the past (step S185). When the power difference-large flag is set to be OFF, the signal processing unit 18 sets the discontinuity counter to be two (2) (step S186) and proceeds to next processing (E in FIG. 25). On the other hand, when the power difference-large flag is set to be ON, the signal processing unit 18 sets the discontinuity counter to be five (5) (step S187) and proceeds to next processing (E in FIG. 25).

That is, when the difference of the signal levels of the moving object paired data consecutively detected is large, the signal processing unit performs the continuity determination for the paired data detected thereafter more times than usual while regarding that there is a possibility of the mis-pairing. Thereby, since it is possible to retard the target decision of the moving object paired data, it is possible to prevent a ghost from being falsely detected.

Meanwhile, in this illustrative embodiment, even when the difference of the signal levels is large, there is a possibility that the moving object paired data is a true target. For this reason, when even a target of which the reliability of the paired data is regarded as to be low satisfies a predetermined condition, the ON state of the power difference-large flag may be released. In this case, a reserve counter is used. The reserve counter is a counter that increases when a Mahalanobis distance of the moving object paired data is short. The short Mahalanobis distance includes a possibility that the moving object paired data is normal. Therefore, when the reserve counter reaches a predetermined count, the power difference-large flag is set to be OFF while regarding that there is no possibility of the mis-pairing.

First, the signal processing unit 18 sets the reserve counter to be zero (0) when the new moving object paired data is detected. Then, when the moving object paired data having low reliability is detected as the moving object paired data having the continuity, the signal processing unit 18 determines whether the power difference-large flag of the moving object paired data of the same target detected in the past scanning is set to be ON. When it is determined that the power difference-large flag has been already set to be ON, the signal processing unit determines whether the reserve counter is five (5) or larger. When the reserve counter is five (5) or larger, the signal processing unit 18 sets the power difference-large flag of the moving object paired data detected in this time scanning to be OFF. On the other hand, when the reserve counter is four (4) or smaller, the signal processing unit determines whether the Mahalanobis distance of the moving object paired data detected in this time scanning is 9 or smaller. When the Mahalanobis distance is 9 or smaller, the signal processing unit 18 increases the reserve counter by one (1). When the Mahalanobis distance is larger than 9, the signal processing unit does not increase the reserve counter. Thereby, when even the moving object paired data that is regarded as to have the possibility of the mis-pairing has a high possibility of the normal pairing, it is possible to prevent the decision of the true target from being delayed.

3. Third Illustrative Embodiment

In the below, a third illustrative embodiment is described. The third illustrative embodiment is different from the respective illustrative embodiments as regards the continuity determination processing. The configuration of the vehicle control system and the other processing are the same as the first illustrative embodiment. Thus, the continuity determination processing is mainly described in the below.

3-1. Continuity Determination Processing

Figure 26:
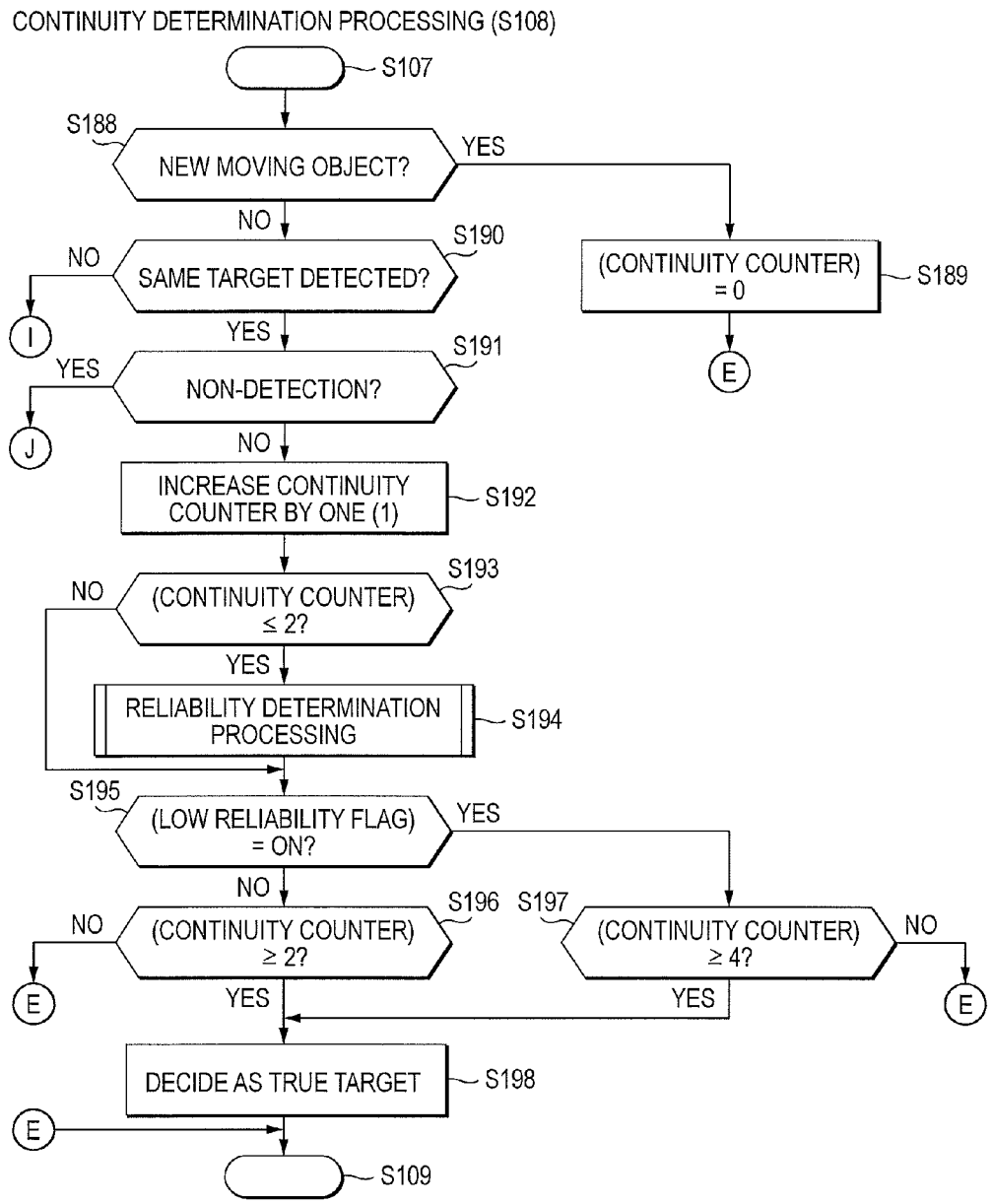
FIG. 26 is a flow chart showing the continuity determining processing.
Figure 27:
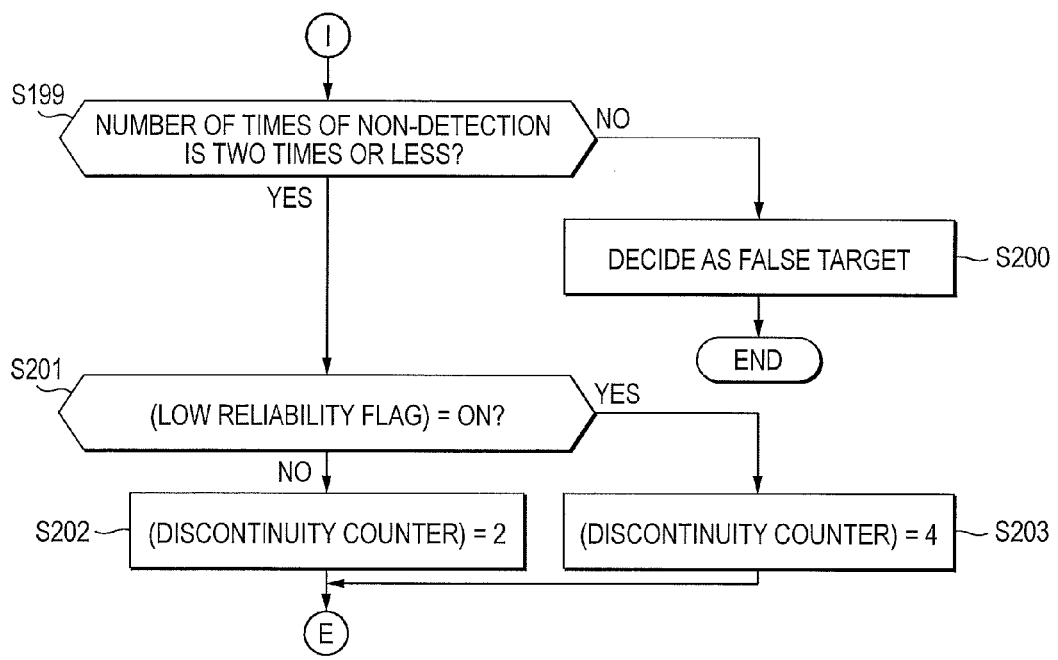
FIG. 27 is a flow chart showing the continuity determining processing.
Figure 28:
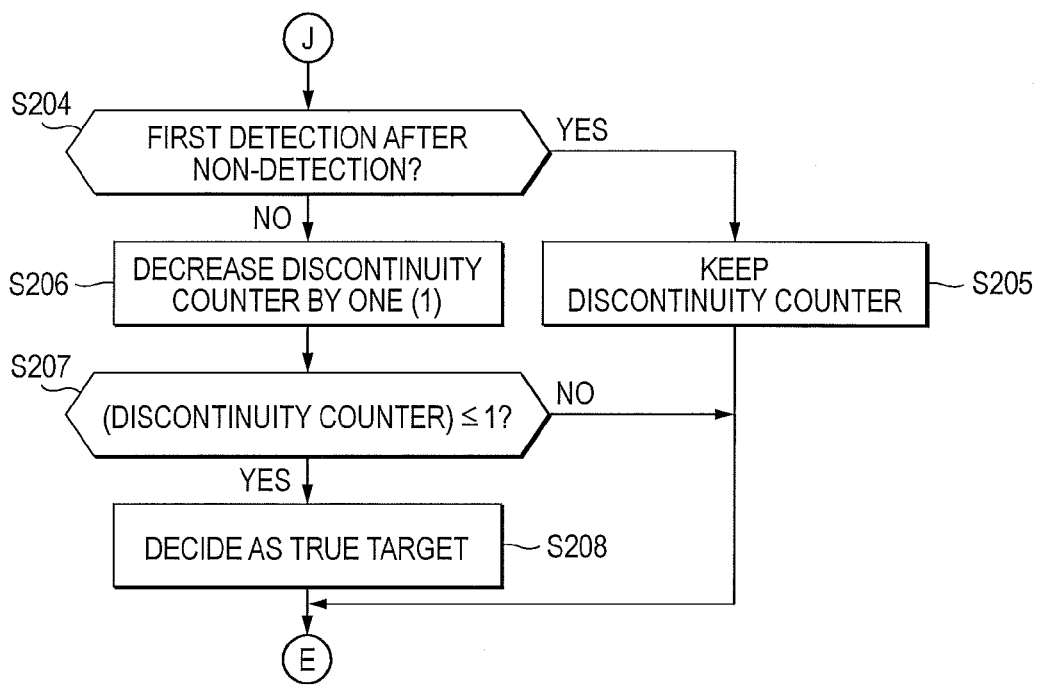
FIG. 28 is a flow chart showing the continuity determining processing.

The detailed continuity determination processing (step S108) of the third illustrative embodiment is described with reference to FIGS. 26 to 29. FIG. 26 is a flow chart showing the continuity determination processing. In the continuity determination processing of this illustrative embodiment, when a sum of the Mahalanobis distances of the moving object paired data for which the continuity has been determined is large, processing of determining that there is a possibility that the derived moving object paired data is mispaired is performed and the continuity determination is performed depending on a result of the determination. That is, in the continuity determination processing of this illustrative embodiment, the reliability determination processing is included in the continuity determination (target decision) processing. In the below, the processing is specifically described.

First, the signal processing unit 18 determines whether the paired data detected in this time scanning is the new moving object paired data (step S188). When the paired data detected in this time scanning is the new moving object paired data, the signal processing unit 18 sets the continuity counter to be zero (0) (step S189). On the other hand, when the paired data detected in this time scanning is not the new moving object paired data, the signal processing unit 18 determines whether the detected target is the moving object paired data of the same target as the moving object paired data detected in the previous time scanning (step S190). When the moving object paired data of the same target as the moving object paired data detected in the previous time scanning is detected, the signal processing unit determines whether there is a case where the moving object paired data of the same target could not be detected in the past scanning (step S191). The respective processing is the same as the first illustrative embodiment.

When it is determined that there is no case where the moving object paired data of the same target could not be detected in the past scanning (i.e., the moving object paired data of the same target is consecutively detected without the non-detection), the signal processing unit 18 increases the continuity counter by one (1) (step S192). Then, the signal processing unit 18 determines whether the continuity counter is two (2) or smaller (step S193). When the continuity counter is two (2) or smaller, the signal processing unit performs the reliability determination processing (step S194). When the continuity counter is not two (2) or smaller, the signal processing unit proceeds to next processing (step S195) without performing the reliability determination processing.

Figure 29:
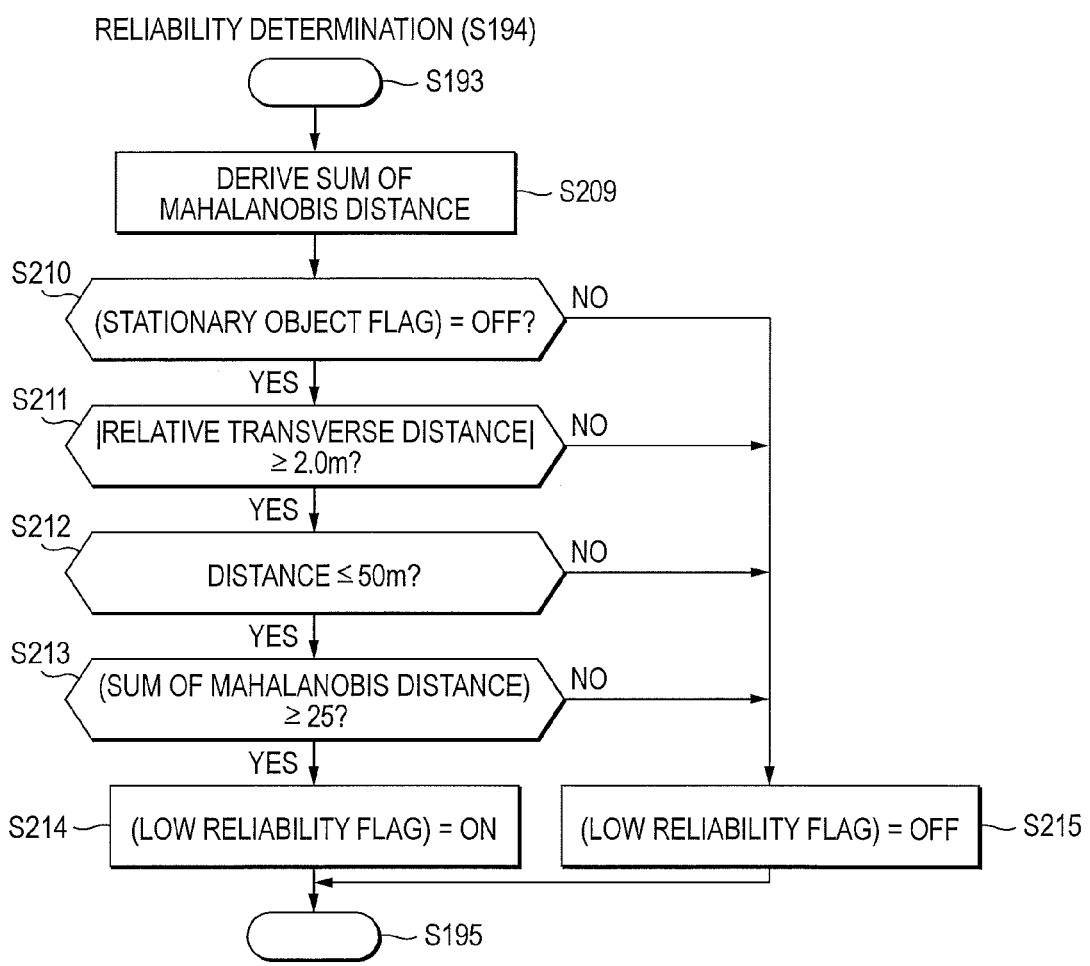
FIG. 29 is a flow chart showing the continuity determining processing.

Here, the reliability determination processing is described. FIG. 29 is a flow chart showing the reliability determination processing. When the continuity counter is two (2) or smaller, the signal processing unit 18 derives a sum of the Mahalanobis distances (step S209). The case where the continuity counter is two (2) or smaller includes a case where the new moving object paired data is detected and then the moving object paired data detected in a next time scanning is determined as to have the continuity and a case where the moving object paired data further detected in a next time scanning is determined as to have the continuity. Therefore, the signal processing unit 18 derives and sums the Mahalanobis distances from the moving object paired data of the two or three targets including the new moving object paired data.

Then, the signal processing unit 18 determines whether the stationary object flag is OFF from the moving object paired data detected this time (step S210). This is to confirm the moving object paired data. When the moving object paired data is determined, the signal processing unit 18 determines whether an absolute value of the relative transverse distance derived from the moving object paired data detected this time is 2.0 m or larger (step S211). The reason is that the moving object paired data existing on a traffic lane except for the own traffic lane is targeted. That is, if even the moving object paired data existing on the own traffic lane is targeted, the target decision of the moving object paired data to be detected as a preceding vehicle may be delayed or a false target may be erroneously decided.

Then, the signal processing unit 18 determines whether the distance derived from the moving object paired data is 50 m or shorter (step S212). This is to exclude the moving object paired data distant from the own vehicle. Then, the signal processing unit 18 determines whether the sum of the Mahalanobis distances derived from the moving object paired data satisfying the conditions of steps S210 to S212 is 25 or larger (step S213). As the Mahalanobis distance is smaller, it approaches a true value and the reliability of the moving object paired data is higher. Therefore, when the Mahalanobis distance is larger than a predetermined value, the signal processing unit 18 determines that the reliability is low. That is, the signal processing unit 18 determines that the moving object paired data having the Mahalanobis distance sum of 25 or larger has the low reliability and sets a low reliability flag to be ON (step S214).

On the other hand, since the moving object paired data that does not satisfy any one condition of steps S210 to S213 is not a target for which the reliability determination is performed or is a target having high reliability, the signal processing unit 18 sets the low reliability flag to be OFF (step S215). In the meantime, the values of the respective conditions are not limited to the above and can be appropriately set.

Returning back to FIG. 26, the signal processing unit 18 determines whether the low reliability flag is ON (step S195). When the low reliability flag is not ON, the signal processing unit 18 determines whether the continuity counter is two (2) or larger (step S196). When the continuity counter is two (2) or larger, the signal processing unit sets the continuous pair decision flag to be ON and decides the detected moving object paired data as a true target (step S198). On the other hand, when the continuity counter is not two (2) or larger, the signal processing unit proceeds to next processing (E in FIG. 26).

On the other hand, when the reliability flag is ON, the signal processing unit 18 determines whether the continuity counter is four (4) or larger (step S197). When the continuity counter is four (4) or larger, the signal processing unit sets the continuous pair decision flag to be ON and decides the detected moving object paired data as a true target (step S198). On the other hand, when the continuity counter is not four (4) or larger, the signal processing unit proceeds to next processing (E in FIG. 26).

Meanwhile, when it is determined in step S190 that the moving object paired data of the same target as the moving object paired data detected in the previous time scanning is not detected (I in FIG. 26), the signal processing unit 18 determines whether the number of times of the non-detection is two times or less (step S199). When the number of times of the non-detection is not two times or less, the signal processing unit 18 decides the detected moving object paired data as a false target (step S196) and ends the processing. Also, when the number of times of the non-detection is two times or less, the signal processing unit 18 determines whether the low reliability flag is ON or not (step S197). When the low reliability flag is not ON, the signal processing unit 18 sets the discontinuity counter to be two (2) (step S198). When the low reliability flag is ON, the signal processing unit 18 sets the discontinuity counter to be four (4) (step S199). The respective processing can be performed by the same method as the first illustrative embodiment.

Also, when it is determined in step S191 that there is a case where the moving object paired data of the same target could not be detected in the past scanning (J in FIG. 26), the signal processing unit 18 determines whether the moving object paired data detected in this time scanning is the first moving object paired data detected after the non-detection (step S204). When the moving object paired data is the first moving object paired data detected after the non-detection, the signal processing unit 18 keeps the discontinuity counter (step S205). On the other hand, when the moving object paired data is not the first moving object paired data detected after the non-detection, the signal processing unit 18 decreases the discontinuity counter by one (1) (step S207). Then, the signal processing unit 18 determines whether the discontinuity counter is one (1) or smaller (step S208). When the discontinuity counter is one (1) or smaller, the signal processing unit 18 sets the continuous pair decision flag to be ON and decides the detected moving object paired data as a true target (step S208). When the discontinuity counter is not one (1) or smaller, the signal processing unit proceeds to next processing (E in FIG. 28). The respective processing can be also performed by the same method as the first illustrative embodiment.

Thereby, when there is a possibility that the detected moving object paired data is mis-paired, the continuity determination is performed more times than usual. Thereby, since it is possible to retard the target decision, it is possible to prevent a ghost from being falsely detected.

4. Fourth Illustrative Embodiment

In the below, a fourth illustrative embodiment is described. The fourth illustrative embodiment is different from the respective illustrative embodiments as regards the continuity determination processing. The configuration of the vehicle control system and the other processing are the same as the first illustrative embodiment. Thus, the continuity determination processing is mainly described in the below.

4-1. Continuity Determination Processing

Figure 30:
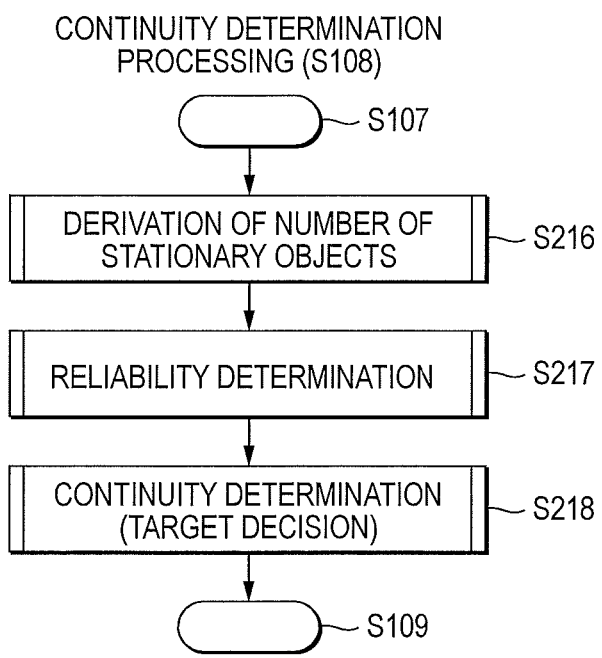
FIG. 30 is a flow chart showing the continuity determining processing.

The detailed continuity determination processing (step S108) of the fourth illustrative embodiment is described with reference to FIGS. 30 to 35. FIG. 30 is a flow chart showing the continuity determination processing. In the continuity determination processing of this illustrative embodiment, when the stationary object such as road marker is positioned above the traffic lane in which the vehicle is traveling, processing of determining that there is a possibility that the detected moving object paired data is mis-paired is performed and the continuity determination is performed depending on a result of the determination. That is, as shown in FIG. 30, in the continuity determination processing, the signal processing unit derives the number of stationary objects (step S216) and performs the reliability determination processing for the detected moving object paired data (step S213). Then, the continuity determination (target decision) processing is performed depending on a result of the reliability determination (step S214). In the below, the processing is specifically described.

Figure 31:
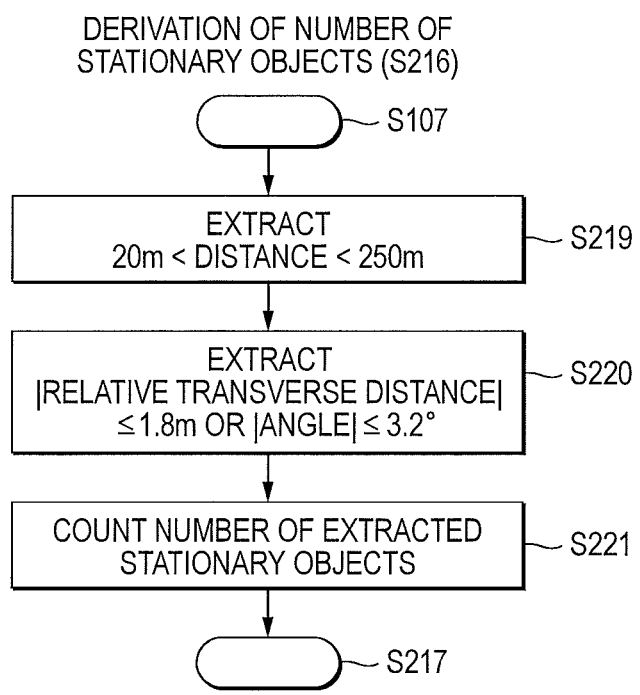
FIG. 31 is a flow chart showing processing of deriving a number of stationary objects.

FIG. 31 is a flow chart showing processing of deriving the number of stationary object paired data. The signal processing unit 18 extracts stationary object paired data existing within a range of 20 m to 250 m from the own vehicle (the radar apparatus 1) from the detected paired data (step S219). Then, the signal processing unit 18 extracts stationary object paired data having an absolute value of the relative transverse distance of 1.8 m or smaller or having an absolute value of the angle of 3.2° or smaller from the extracted stationary object paired data (step S220). This is to extract the stationary object paired data existing on the own vehicle traffic lane. The relative transverse distance and the angle can be derived from the stationary object paired data. Then, the signal processing unit 18 counts the number of the extracted stationary object paired data and derives the number of the stationary object paired data existing on the own traffic lane (step S221). That is, when a plurality of stationary objects or one large stationary object exists on the own traffic lane, the stationary object paired data is also detected in plural. For this reason, it is possible to determine that a plurality of stationary objects or one large stationary object exists on the own traffic lane by the number of the stationary object paired data obtained in step S221.

Figure 32:
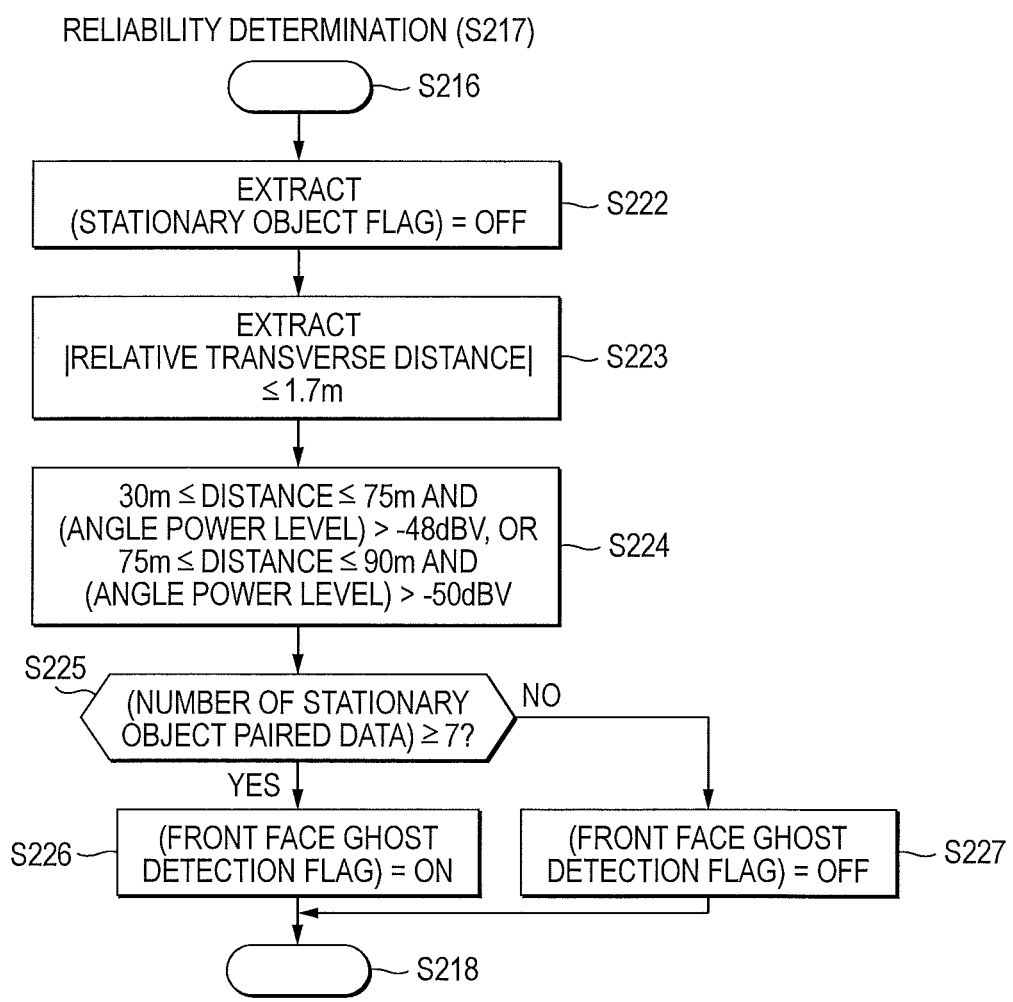
FIG. 32 is a flow chart showing reliability determining processing.

When the number of the stationary object paired data is derived, the signal processing unit executes the reliability determination processing. FIG. 32 is a flow chart showing the reliability determination processing. The signal processing unit 18 extracts moving object paired data from the detected paired data. That is, the signal processing unit extracts the paired data of which the stationary object flag is set to be OFF (step S222). Then, the signal processing unit extracts the moving object paired data having an absolute value of the relative transverse distance of 1.7 m or smaller from the extracted moving object paired data (step S223). This is to extract the moving object paired data existing on the own traffic lane. The relative transverse distance can be also derived from the moving object paired data.

Then, the signal processing unit 18 extracts moving object paired data that exists at a predetermined distance and has a predetermined angle power level from the extracted moving object paired data (step S224). Specifically, the signal processing unit 18 extracts the moving object paired data existing within a range of 30 m to 75 m from the own vehicle and extracts the moving object paired data having the signal level of the angle spectrum larger than −48 dBV from the extracted moving object paired data. Also, the signal processing unit 18 extracts the moving object paired data existing within a range of 75 m to 97 m from the own vehicle and extracts the moving object paired data having the signal level of the angle spectrum larger than −50 dBV from the extracted moving object paired data. This is to remove the noise by extracting the moving object paired data having the predetermined signal level. The distances and signal levels can be also derived from the moving object paired data.

Then, the signal processing unit 18 determines whether the number of the stationary object paired data derived in the processing of deriving the number of stationary object is 7 or larger (step S225). When the number of the stationary object paired data is 7 or larger, a plurality of signboards such as a road marker or one large signboard exists above the own traffic lane, so that the possibility of the mis-pairing is increased. For this reason, when it is determined that the number of the stationary object paired data is 7 or larger, the signal processing unit 18 determines that the reliability is low and sets a front face ghost detection flag to be ON (step S226). A case where the front face ghost detection flag is ON indicates that the reliability of the moving object paired data existing on the own traffic lane is low. On the other hand, when it is determined that the number of the stationary object paired data is not 7 or larger, the signal processing unit 18 determines that the reliability is not low and sets the front face ghost detection flag to be OFF (step S227). In the meantime, the values of the respective conditions are not limited to the above and can be appropriately set.

Figure 33:
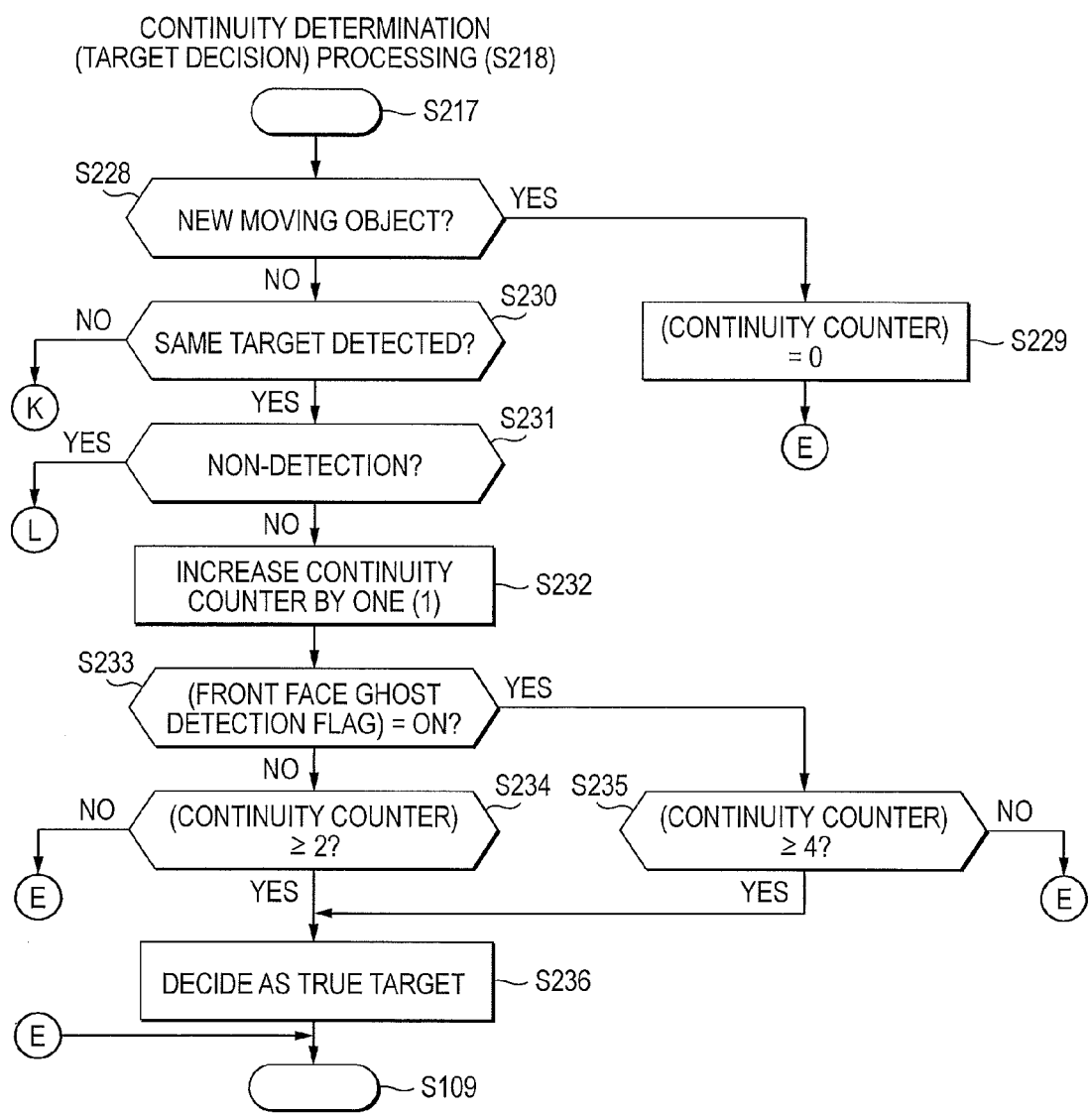
FIG. 33 is a flow chart showing continuity determining (target deciding) processing.
Figure 34:
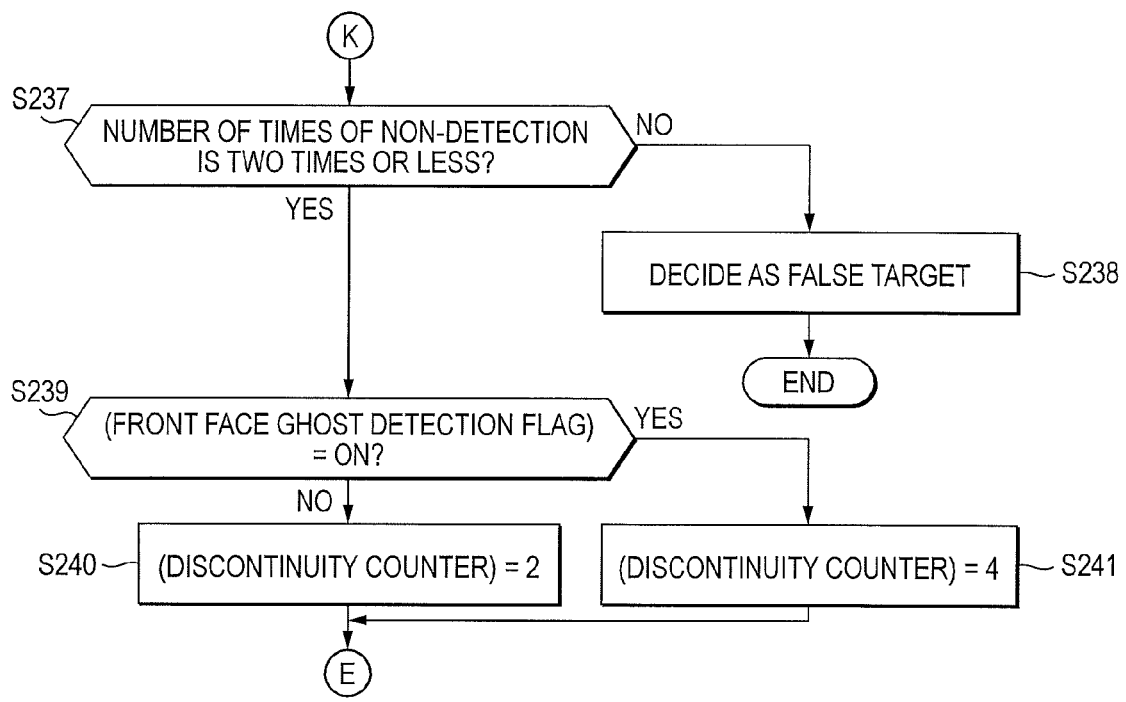
FIG. 34 is a flow chart showing the continuity determining (target deciding) processing.
Figure 35:
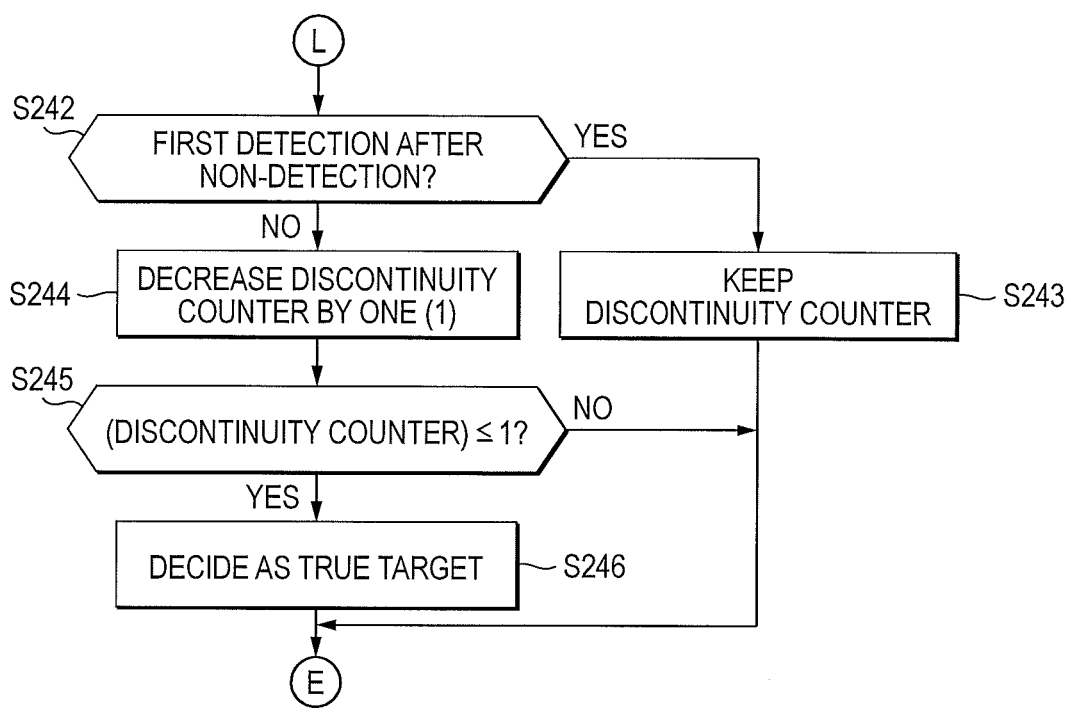
FIG. 35 is a flow chart showing the continuity determining (target deciding) processing.

When the reliability is determined, the signal processing unit 18 performs the continuity determination (target decision) processing. FIGS. 33 to 35 are flow charts showing the continuity determination (target decision) processing.

First, the signal processing unit 18 determines whether the moving object paired data detected in this time scanning is the new moving object paired data (step S228). When the moving object paired data is the new moving object paired data, the signal processing unit 18 sets the continuity flag to be zero (0) (step S229). On the other hand, when the moving object paired data is not the new moving object paired data, the signal processing unit 18 determines whether the detected moving object paired data is the moving object paired data of the same target as the moving object paired data detected in the previous time scanning (step S230). When the moving object paired data of the same target as the moving object paired data detected in the previous time scanning is detected, the signal processing unit determines whether there is a case where the moving object paired data of the same target could not be detected in the past scanning (step S231). When it is determined that there is a case where the moving object paired data of the same target could not be detected in the past scanning (i.e., the moving object paired data of the same target is consecutively detected without being detected), the signal processing unit 18 increases the continuity counter by one (1) (step S232). The respective processing is the same as the first illustrative embodiment.

Then, the signal processing unit 18 determines whether the front face ghost detection flag is ON (step S233). When the front face ghost detection flag is not ON, the signal processing unit 18 determines whether the continuity counter is two (2) or larger (step S234). When the continuity counter is two (2) or larger, the signal processing unit sets the continuous pair decision flag to be ON and decides the detected moving object paired data as a true target (step S236). On the other hand, when the continuity counter is not two (2) or larger, the signal processing unit proceeds to next processing (E in FIG. 33).

On the other hand, when the front face ghost detection flag is ON, the signal processing unit 18 determines whether the continuity counter is four (4) or larger (step S235). When the continuity counter is four (4) or larger, the signal processing unit sets the continuous pair decision flag to be ON and decides the detected moving object paired data as a true target (step S236). On the other hand, when the continuity counter is not four (4) or larger, the signal processing unit proceeds to next processing (E in FIG. 33).

On the other hand, whet it is determined in step S230 that the moving object paired data of the same target as the moving object paired data detected in the previous time scanning is not detected (K in FIG. 33), the signal processing unit 18 determines whether the number of times of the non-detection is two times or less (step S237). When the number of times of the non-detection is not two times or less, the signal processing unit 18 decides the detected moving object paired data as a false target (step S238) and ends the processing. Also, when the number of times of the non-detection is two times or less, the signal processing unit 18 determines whether the front face ghost detection flag is ON (step S239). When the front face ghost detection flag is not ON, the signal processing unit 18 sets the discontinuity counter to be two (2) (step S240). When the front face ghost detection flag is ON, the signal processing unit 18 sets the discontinuity counter to be four (4) (step S241). The respective processing is the same as the first illustrative embodiment.

Also, when it is determined in step S231 that there is a case where the moving object paired data of the same target could not be detected in the past scanning (L in FIG. 33), the signal processing unit 18 determines whether the moving object paired data detected in this time scanning is the first moving object paired data detected after the non-detection (step S242). When the moving object paired data is the first moving object paired data detected after the non-detection, the signal processing unit 18 keeps the discontinuity counter (step S243). On the other hand, when the moving object paired data is not the first moving object paired data detected after the non-detection, the signal processing unit 18 decreases the discontinuity counter by one (1) (step S244). Then, the signal processing unit 18 determines whether the discontinuity counter is one (1) or smaller (step S245). When the discontinuity counter is one (1) or smaller, the signal processing unit 18 sets the continuous pair decision flag to be ON and decides the detected moving object paired data as a true target (step S246). When the discontinuity counter is not one (1) or smaller, the signal processing unit proceeds to next processing (E in FIG. 35). The respective processing can be also performed by the same method as the first illustrative embodiment.

Thereby, when there is a possibility that the detected moving object paired data is mis-paired, the continuity determination is performed more times than usual. Thereby, since it is possible to retard the target decision, it is possible to prevent a ghost from being falsely detected.

Although the illustrative embodiments of the invention have been described, the invention is not limited to the above illustrative embodiments. Also, the respective illustrative embodiments can be appropriately combined.

Also, in the respective illustrative embodiments, the various functions are software-implemented by the calculation processing of the CPU in response to the programs. However, some of the functions may be implemented by an electrical hardware circuit. Also, to the contrary, some of functions that are implemented by the hardware circuit may be software-implemented.

What is claimed is:

1. A radar apparatus comprising:
   a derivation unit configured to derive target information which is information relating to a target detected on the basis of a transmission signal of which a frequency changes with a predetermined cycle and a reception signal corresponding to a reflected wave coming from an object at which a transmission wave corresponding to the transmission signal is reflected;
   a determination unit configured to determine reliability of the target information; and
   a decision unit configured to decide whether the detected target is true or false, based on the target information,
   wherein the decision unit changes a method of deciding whether the target is true or false in accordance with a determination result of the reliability by the determination unit.

2. The radar apparatus according to claim 1,
   wherein the decision unit determines whether each target corresponding to the target information which is temporally consecutively derived is the same target,
   wherein when it is determined consecutively predetermined number of times that each target is the same target, the decision unit decides the target as a true target, and
   wherein the decision unit changes the predetermined number of times in accordance with the determination result of the reliability.

3. The radar apparatus according to claim 2, wherein the decision unit increases the predetermined number of times when the reliability is low.

4. The radar apparatus according to claim 1, further comprising:
   an extraction unit configured to extract peak signals which are obtained from a difference frequency between the transmission signal and the reception signal, in a first period in which the frequency of the transmission signal ascends and a second period in which the frequency descends; and a pairing unit configured to pair the peaks signal of the first period and the peak signal of the second period based on a predetermined condition, wherein the determination unit determines the reliability on the basis of a true-false possibility of the pairing.

5. The radar apparatus according to claim 4, wherein the determination unit determines that the reliability is low when there is a possibility that the pairing is falsely made.

6. The radar apparatus according to claim 4, wherein the determination unit determines that the reliability is low when the detected target is a moving target and a position of the moving target is included within a predetermined range from a position of the other stationary target.

7. The radar apparatus according to claim 6, wherein the target information includes an own traffic lane probability indicating a probability that a target exists on a traffic lane in which a vehicle mounted with the radar apparatus is traveling, and wherein the other stationary object is extracted from a stationary target existing at a position that is more distant from the vehicle than a reference position determined based on the own traffic lane probability.

8. The radar apparatus according to claim 7, wherein the reference position is a position corresponding to a distance in a direction substantially orthogonal to a central axis of the radar apparatus and is changeable depending on the own traffic lane probability.

9. The radar apparatus according to claim 4, wherein the determination unit determines that the reliability is low when a difference of respective reception levels of the target information which is temporally consecutively derived is a predetermined value or larger.

10. The radar apparatus according to claim 4, wherein the determination unit determines that the reliability is low when a sum of respective Mahalanobis distances included in the target information which is temporally consecutively derived is a predetermined value or larger.

11. The radar apparatus according to claim 4, wherein the determination unit determines that the reliability is low when a number of stationary targets present on a traffic lane in which a vehicle mounted with the radar apparatus is traveling is a predetermined value or larger.

12. A signal processing method associated with a radar apparatus, the method comprising:

(a) deriving, by a computer processor, target information which is information relating to a target detected based on a transmission signal of which a frequency changes with a predetermined cycle and a reception signal corresponding to a reflected wave coming from an object at which a transmission wave corresponding to the transmission signal is reflected;

(b) determining, by the computer processor, reliability of the target information; and (c) deciding, by the computer processor, whether the detected target is true or false, based on the target information, wherein in the step (c), a method of deciding whether the target is true or false is changed in accordance with a determination result of the reliability.

* * * * *